US012400600B2

(12) United States Patent
Kim et al.

(10) Patent No.: US 12,400,600 B2
(45) Date of Patent: Aug. 26, 2025

(54) SCAN SIGNAL DRIVER AND DISPLAY DEVICE INCLUDING THE SAME

(71) Applicants: Samsung Display Co., LTD., Yongin-si (KR); Konkuk University Industrial Cooperation Corp, Seoul (KR)

(72) Inventors: Dong Woo Kim, Yongin-si (KR); Kee Chan Park, Seoul (KR); Yi Kyoung You, Seoul (KR); Chong Chul Chai, Yongin-si (KR); Kyung Ho Kim, Yongin-si (KR); Joon Ho Lee, Seongnam-si (KR)

(73) Assignees: Samsung Display Co., Ltd., Yongin-si (KR); Konkuk University Industrial Cooperation Corp, Seoul (KR)

( * ) Notice: Subject to any disclaimer, the term of this patent is extended or adjusted under 35 U.S.C. 154(b) by 0 days.

(21) Appl. No.: 18/347,489

(22) Filed: Jul. 5, 2023

(65) Prior Publication Data

US 2024/0194146 A1 Jun. 13, 2024

(30) Foreign Application Priority Data

Dec. 13, 2022 (KR) ........................ 10-2022-0173865

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01);
(Continued)

(58) Field of Classification Search
None
See application file for complete search history.

(56) References Cited

U.S. PATENT DOCUMENTS 11,798,486 B2 * 10/2023 Feng .................... G09G 3/3225
2017/0256220 A1 * 9/2017 Huang ..................... G09G 3/20
(Continued)

FOREIGN PATENT DOCUMENTS

KR 10-2006-0029389 A 4/2006
KR 10-2011-0123459 A 11/2011
(Continued)

*Primary Examiner* — Patrick N Edouard
*Assistant Examiner* — Peijie Shen
(74) *Attorney, Agent, or Firm* — Womble Bond Dickinson (US) LLP

(57) ABSTRACT

A scan signal driver includes: stages to sequentially output scan signals in an active period, and to selectively output sensing signals in a vertical blank period. At least one of the stages includes: a sensing control circuit to supply a gate-on voltage to a sensing control node in response to a holding control signal during the active period, and to output the gate-on voltage of the sensing control node in response to a selectively input line select signal during the vertical blank period; an output node control circuit to supply the gate-on voltage to a pull-up node when the gate-on voltage of the sensing control node is output during the vertical blank period; and an output circuit to output a scan clock signal as a sensing signal to one of scan signal lines when the gate-on voltage is supplied to the pull-up node during the vertical blank period.

20 Claims, 20 Drawing Sheets

(52) U.S. Cl.
CPC ............... *G09G 2300/0842* (2013.01); *G09G 2310/0286* (2013.01); *G09G 2310/08* (2013.01)

(56) References Cited

U.S. PATENT DOCUMENTS

| | | | | |
|---|---|---|---|---|
| 2019/0333596 | A1* | 10/2019 | Zhu | G11C 19/287 |
| 2019/0347996 | A1* | 11/2019 | Zhu | G11C 19/28 |
| 2020/0074932 | A1* | 3/2020 | Park | G09G 3/3266 |
| 2020/0135115 | A1* | 4/2020 | Chang | G09G 3/3233 |
| 2020/0168163 | A1* | 5/2020 | Kim | G09G 3/3291 |
| 2020/0184898 | A1* | 6/2020 | Choi | G09G 3/3233 |
| 2020/0380911 | A1* | 12/2020 | Park | G09G 3/3266 |
| 2021/0201767 | A1* | 7/2021 | Park | G09G 3/32 |
| 2021/0335263 | A1* | 10/2021 | Byun | G09G 5/10 |
| 2022/0005400 | A1* | 1/2022 | Feng | G09G 3/2092 |
| 2023/0010366 | A1* | 1/2023 | Son | G11C 19/28 |
| 2023/0093654 | A1* | 3/2023 | Li | G09G 3/2092 345/55 |

FOREIGN PATENT DOCUMENTS

| | | | |
|---|---|---|---|
| KR | 10-2011-0123467 | A | 11/2011 |
| KR | 10-2017-0078978 | A | 7/2017 |
| KR | 10-2020-0048784 | A | 5/2020 |
| KR | 10-2020-0049677 | A | 5/2020 |

* cited by examiner

SCAN SIGNAL DRIVER AND DISPLAY DEVICE INCLUDING THE SAME

CROSS-REFERENCE TO RELATED APPLICATION

This application claims priority to and the benefit of Korean Patent Application No. 10-2022-0173865, filed on Dec. 13, 2022, in the Korean Intellectual Property Office, the entire content of which is incorporated by reference herein.

BACKGROUND

1. Field

Aspects of embodiments of the present disclosure relate to a scan signal driver, and a display device including the scan signal driver.

2. Description of the Related Art

As information-oriented society evolves, various demands for display devices are ever increasing. For example, display devices are being employed by a variety of electronic devices, such as smart phones, digital cameras, laptop computers, navigation devices, and smart televisions.

Display devices may be flat-panel display devices, such as a liquid-crystal display device, a quantum-dot display device, and an organic light-emitting display device.

A display device includes a display panel including data lines, scan signal lines, a plurality of pixels connected to the data lines and the scan signal lines, a scan signal driver for supplying scan signals to the scan signal lines, and a data driver for supplying data voltages to the data lines. The scan signal driver may be formed in the non-display area of the display panel.

The above information disclosed in this Background section is for enhancement of understanding of the background of the present disclosure, and therefore, it may contain information that does not constitute prior art.

SUMMARY

From among the display devices, an organic light-emitting display device may employ an external compensation technique to improve image display quality. The external compensation technique compensates for deviations in driving characteristics between pixels by sensing a pixel voltage or a current according to the driving characteristics of the pixels, and modulating image data based on the sensed results.

For an external compensation operation, a scan signal may be additionally supplied for a sensing operation of each pixel during a period (e.g., a certain or predetermined period) in which no input image is written to each pixel, for example, such as a blank period. As such, it may be desirable for scan signal output stages of the scan signal driver to remain enabled by a gate-on voltage even during such a blank period.

However, it may be difficult for the scan signal output stages, which may include thin-film transistors, to maintain the gate-on voltage at connection nodes of the thin-film transistors, because the thin-film transistors may operate in a depletion mode. If the level of the gate-on voltage supplied to the connection nodes of the thin-film transistors is not maintained and becomes small, the scan signals may not be output. When this happens, the sensing operation of each pixel may not be properly performed, and the external compensation operation performance may also be deteriorated.

One or more embodiments of the present disclosure are directed to a scan signal driver that employs a sensing control unit (e.g., a sensing controller)_having a simplified circuit structure to stably maintain a gate-on voltage of the scan signal output stages during a sensing period for external compensation.

One or more embodiments of the present disclosure are directed to a scan signal driver that may prevent or substantially prevent thin-film transistors that are disposed to maintain the gate-on voltage supplied to pull-up nodes of the scan signal output stages from operating in a depletion mode.

One or more embodiments of the present disclosure are directed to a scan signal driver that allows the thin-film transistors to operate within ranges of the gate-on voltage and gate-off voltage by separating the pull-up node of the scan signal output stage with a thin-film transistor.

However, the aspects and features of the present disclosure are not limited to those discussed above, and other aspects and features of the present disclosure will be apparent to those having ordinary skill in the art from the following description.

According to one or more embodiments of the present disclosure, a scan signal driver includes: stages configured to sequentially output scan signals to scan signal lines in an active period of an $n^{th}$ frame, and to selectively output sensing signals to the scan signal lines in a vertical blank period of the $n^{th}$ frame, where n is a positive integer. At least one of the stages includes: a sensing control circuit to supply a gate-on voltage to a sensing control node in response to a holding control signal during the active period, and to output the gate-on voltage of the sensing control node in response to a selectively input line select signal during the vertical blank period; an output node control circuit to supply the gate-on voltage to a pull-up node when the gate-on voltage of the sensing control node is output during the vertical blank period; and an output circuit to output a scan clock signal input through a first scan clock terminal as a sensing signal to one of the scan signal lines when the gate-on voltage is supplied to the pull-up node during the vertical blank period.

In an embodiment, the sensing control circuit may include: a first sensing transistor including a first electrode and a gate electrode connected to a gate-on terminal to form a first capacitor between the first electrode and the gate electrode; a second sensing transistor including: a first electrode connected to the gate electrode of the first sensing transistor to form the sensing control node; a second electrode connected to the second electrode of the first sensing transistor; and a gate electrode connected to an input terminal of the holding control signal; a third sensing transistor including: a first electrode connected to the second electrodes of the first and second sensing transistors; a second electrode connected to the pull-up node; and a gate electrode connected to an input terminal of the line select signal; and a fourth sensing transistor including: a first electrode connected to the second electrodes of the first and second sensing transistors; a second electrode connected to a gate-off terminal; and a gate electrode connected to an input terminal of a reset signal.

In an embodiment, when the second and third sensing transistors are turned on in response to the line select signal and the holding control signal input at a level of the gate-on voltage during a first period of the active period, the gate-on voltage may be supplied to the sensing control node.

In an embodiment, when the second and third sensing transistors are turned off in response to the line select signal and the holding control signal input at the level of a gate-off voltage during a second period of the active period, the sensing control node may be maintained at a level of the gate-on voltage, and a voltage of the second electrode of the third sensing transistor connected to the pull-up node may be maintained at a level equal to or greater than a level of a voltage of the first electrode of the third sensing transistor.

In an embodiment, when the third sensing transistor is turned on by the line select signal input at the level of the gate-on voltage during a first period of the vertical blank period, the gate-on voltage of the sensing control node may be supplied to the pull-up node.

In an embodiment, the output node control circuit may include: a first transistor including: a first electrode connected to a previous-stage carry terminal; a second electrode connected to the pull-up node; and a gate electrode connected to a second scan clock terminal; a second transistor including: a first electrode connected to the second electrode of the first transistor; a second electrode connected to the pull-up node; and a gate electrode connected to a gate-on terminal, and configured to remain turned on by the gate-on voltage; a third transistor including: a first electrode connected to a pull-down node; and a gate electrode included by the second electrode of the first transistor to form an output node of the first transistor; a fourth transistor including: a first electrode connected to the second electrode of the third transistor; a second electrode connected to a gate-off terminal; and a gate electrode connected to the second electrode of the first transistor and the gate electrode of the third transistor; a fifth transistor including: a second electrode connected to the second electrode of the third transistor and the first electrode of the fourth transistor; a first electrode connected to the gate-on terminal; and a gate electrode connected to the pull-down node; a sixth transistor including: a first electrode connected to the gate-on terminal; a second electrode connected to the pull-down node; and a gate electrode connected to a subsequent-stage carry terminal; and a reset transistor including: a first electrode connected to the gate-on terminal; a second electrode connected to the pull-down node; and a gate electrode connected to a reset terminal configured to receive a reset signal.

In an embodiment, when the gate-on voltage is supplied to the pull-down node during a third period of the active period, the fifth transistor may be turned on by the gate-on voltage of the pull-down node, and the gate-on voltage of the gate-on terminal may be supplied to the second electrode of the third transistor and the first electrode of the fourth transistor.

In an embodiment, the voltage supplied to the second electrode of the third transistor and the first electrode of the fourth transistor during the third period of the active period may be maintained at a level higher than levels of voltages of the gate electrodes of the third and fourth transistors.

In an embodiment, the output circuit may include: a pull-up transistor including: a first electrode connected to the first scan clock terminal; a second electrode connected to a scan output terminal; and a gate electrode connected to the pull-up node; and a pull-down transistor including: a first electrode connected to the scan output terminal; a second electrode connected to the gate-off terminal; and a gate electrode connected to the pull-down node.

According to one or more embodiments of the present disclosure, a scan signal driver includes: stages configured to sequentially output scan signals to scan signal lines in an active period of an $n^{th}$ frame, and to selectively output sensing signals to the scan signal lines in a vertical blank period of the $n^{th}$ frame, where n is a positive integer. At least one of the stages includes: a sensing control circuit to supply a gate-on voltage to a sensing control node during the active period, and to output the gate-on voltage of the sensing control node during the vertical blank period; an output node control circuit to supply a start signal or a previous-stage carry signal to a pull-up node during the active period, and to supply the gate-on voltage output from the sensing control circuit to the pull-up node during the vertical blank period; and an output circuit to output a scan clock signal input through a first scan clock terminal as a sensing signal to one of the scan signal lines when the gate-on voltage is supplied to the pull-up node during the vertical blank period.

In an embodiment, when at least one sensing control signal is input during a first period of the active period, the sensing control circuit may be configured to supply the gate-on voltage to the sensing control node and maintain the voltage of the sensing control node at the gate-on voltage until the vertical blank period.

In an embodiment, when the at least one sensing control signal is input during a first period of the vertical blank period, the sensing control circuit may be configured to supply the gate-on voltage of the sensing control node to the pull-up node, and when a reset signal is input during a second period of the vertical blank period, the sensing control circuit may be configured to apply a gate-off voltage to the sensing control node in response to the reset signal.

In an embodiment, the sensing control circuit may include: a first sensing transistor including a first electrode and a gate electrode connected to a gate-on terminal to form a first capacitor between the first electrode and the gate electrode; a second sensing transistor forming the sensing control node with the first sensing transistor, and configured to hold the gate-on voltage of the sensing control node in response to a holding control signal; a third sensing transistor connected in series with the first and second sensing transistors to supply the gate-on voltage of the sensing control node to the pull-up node in response to a line select signal; and a fourth sensing transistor to apply a gate-off voltage to the sensing control node in response to a reset signal.

In an embodiment, when the third sensing transistor is turned on in response to the line select signal having a gate-on voltage level during the first period of the active period, the gate-on voltage may be supplied to the sensing control node, and when the line select signal is input with a gate-off voltage level during a second period of the active period, the third sensing transistor may be configured to maintain a level of the gate-on voltage of the sensing control node while it is turned off.

In an embodiment, the output node control circuit may include: a first transistor configured to supply the start signal or the previous-stage carry signal to the pull-up node in response to one scan clock signal input during the active period; a second transistor connected in series between the first transistor and the pull-up node to separate an output node of the first transistor from the pull-up node; third and fourth transistors connected in series between a pull-down node and a gate-off terminal to apply a gate-off voltage to the pull-down node in response to the gate-on voltage of the output node; a fifth transistor configured to apply the gate-on voltage to a connection node of the third and fourth transistors in response to the gate-on voltage of the pull-down node; a sixth transistor configured to supply the gate-on voltage to the pull-down node when a scan signal is input from one of subsequent stages; and a reset transistor configured to supply the gate-on voltage to the pull-down node when a reset signal is input.

In an embodiment, a first electrode of the fifth transistor may be connected to a gate-on terminal from which the gate-on voltage is supplied, and a second electrode of the fifth transistor may be connected to the second electrode of the third transistor and a first electrode of the fourth transistor. The fifth transistor may be configured to apply the gate-on voltage of the gate-on terminal to the second electrode of the third transistor and the first electrode of the fourth transistor when the gate-on voltage is supplied to the pull-down node.

In an embodiment, the output circuit may include: a pull-up transistor configured to be turned on by the gate-on voltage of the pull-up node to output one scan clock signal input to the first scan clock terminal to a scan output terminal as the sensing signal during the vertical blank period; and a pull-down transistor configured to be turned on by the gate-on voltage of the pull-down node to apply the gate-off voltage to the scan output terminal.

In an embodiment, the at least one stage may be configured to operate in response to the line select signal, the holding control signal, first to fourth scan clock signals, the previous-stage carry signal, and a subsequent-stage scan signal input during the active period, and the active period in which the at least one stage operates may be divided into a scan initialization period, the first period in which the gate-on voltage is supplied to the pull-up node, a second period in which scan signals are output, a third period in which the scan signals transition to the gate-off voltage, and a fourth period in which the gate-off voltage is not applied to the pull-up node.

In an embodiment, during the scan initialization period, a first transistor of the output node control circuit may be configured to be turned on in response to one scan clock signal from among the first to fourth scan clock signals in the at least one stage. The second and third sensing transistors of the sensing control circuit may be configured to be turned on in response to the line select signal and the holding control signal during the first period, and the previous-stage carry signal may be supplied to the pull-up node through the first transistor. One of the first to fourth scan clock signals may be output to an $n^{th}$ scan signal line through a pull-up transistor of the output circuit during the second period, and the one scan clock signal may be output to the $n^{th}$ scan signal line through the pull-up transistor of the output circuit with a gate-off voltage level during the third period. A scan signal of one of the subsequent stages may be supplied to the output node control circuit to apply the gate-off voltage to the pull-up node during the fourth period.

According to one or more embodiments of the present disclosure, a display device includes: a display panel including: data lines; scan signal lines crossing the data lines; and pixels connected to the data lines and the scan signal lines; a data driver configured to apply data voltages to the data lines; and a scan signal driver including stages configured to sequentially output scan signals during an active period of each frame, and selectively output sensing signals during a vertical blank period, the stages being configured to sequentially output the scan signals to the scan signal lines in the active period of an $n^{th}$ frame, and to selectively output the sensing signals to the scan signal lines in the vertical blank period of the $n^{th}$ frame, where n is a positive integer. At least one of the stages includes: a sensing control circuit to supply a gate-on voltage to a sensing control node in response to a holding control signal during the active period, and to output the gate-on voltage of the sensing control node in response to a selectively input line select signal during the vertical blank period; an output node control circuit to supply the gate-on voltage to a pull-up node when the gate-on voltage of the sensing control node is output during the vertical blank period; and an output circuit to output a scan clock signal input through a first scan clock terminal as a sensing signal to one of the scan signal lines when the gate-on voltage is supplied to the pull-up node during the vertical blank period.

According to one or more embodiments of the present disclosure, a scan signal driver of a display device may employ a sensing control unit (e.g., a sensing controller or a sensing control circuit) that may maintain or substantially maintain a gate-on voltage of scan signal output stages with a reduced number of thin-film transistors, so that it may be possible to reduce the area of the scan signal driver.

According to one or more embodiments of the present disclosure, by preventing the thin-film transistors formed in the scan signal output stages from operating in a depletion mode, it may be possible to stably maintain the gate-on voltage supplied to the pull-up or pull-down node of the scan signal output stages.

According to one or more embodiments of the present disclosure, the thin-film transistors formed in the scan signal output stages may be stably operated within ranges of the gate-on voltage and the gate-off voltage.

However, the present disclosure is not limited to the aspects and features described above, and additional aspects and features will be set forth, in part, in the detailed description that follows with reference to the figures, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
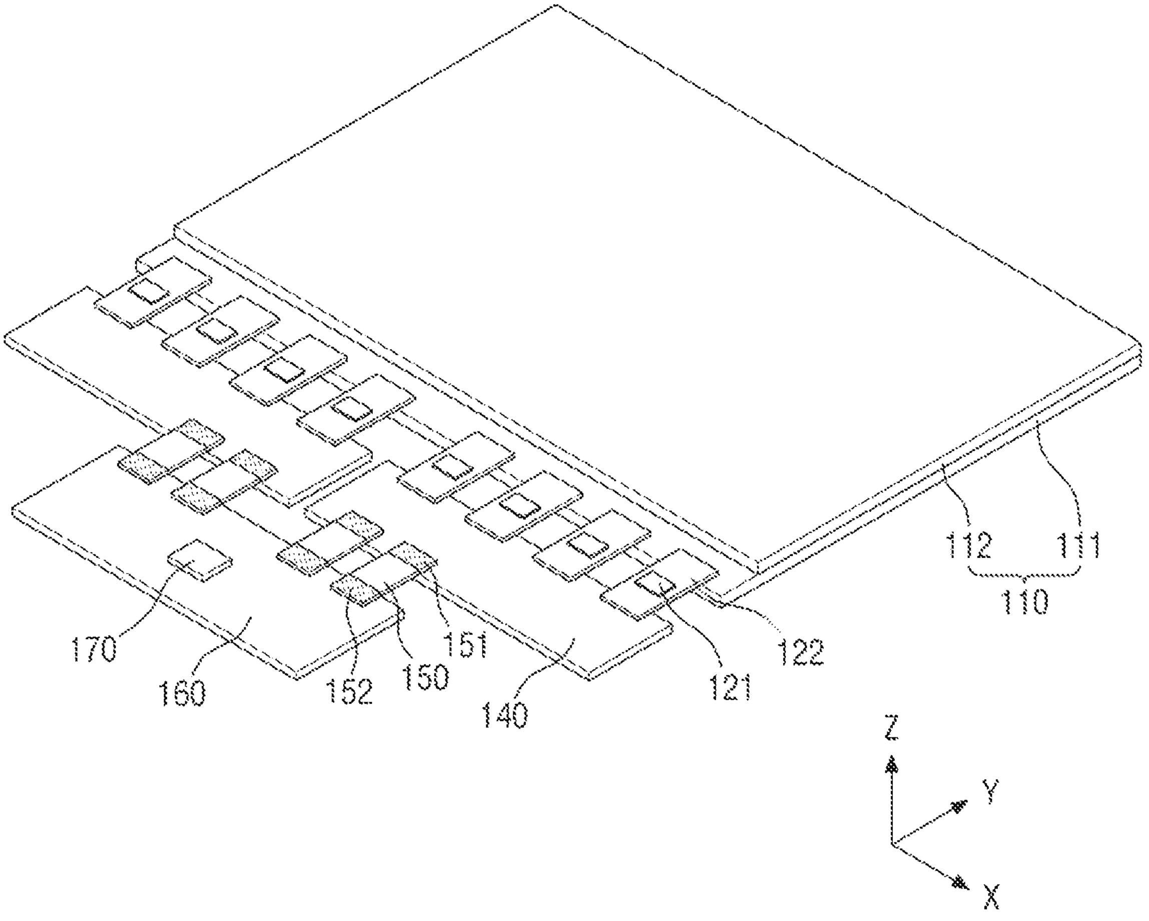
FIG. 1 is a perspective view of a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use,"

"using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
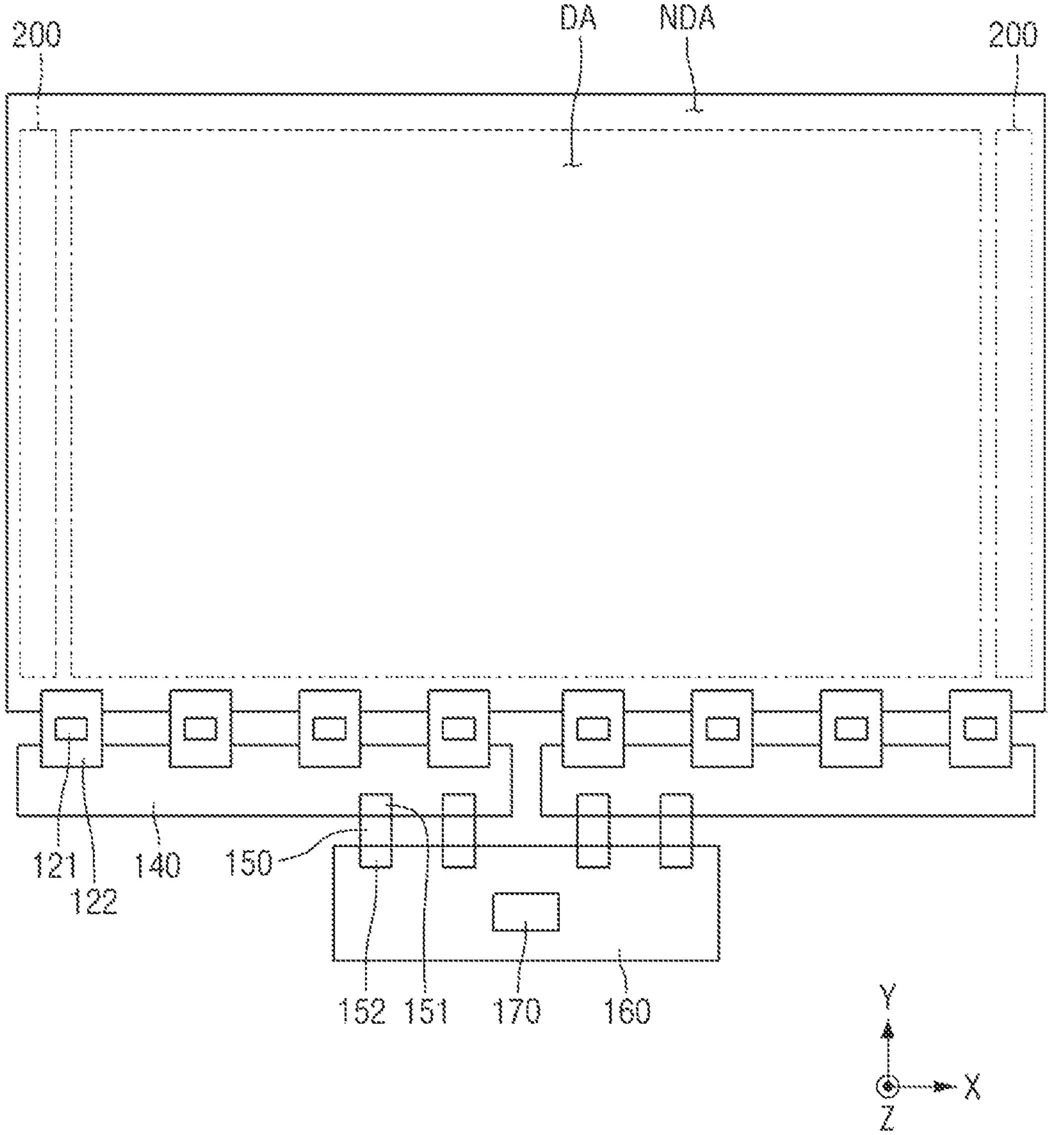
FIG. 2 is a plan view showing a display device according to an embodiment of the present disclosure.
Figure 3:
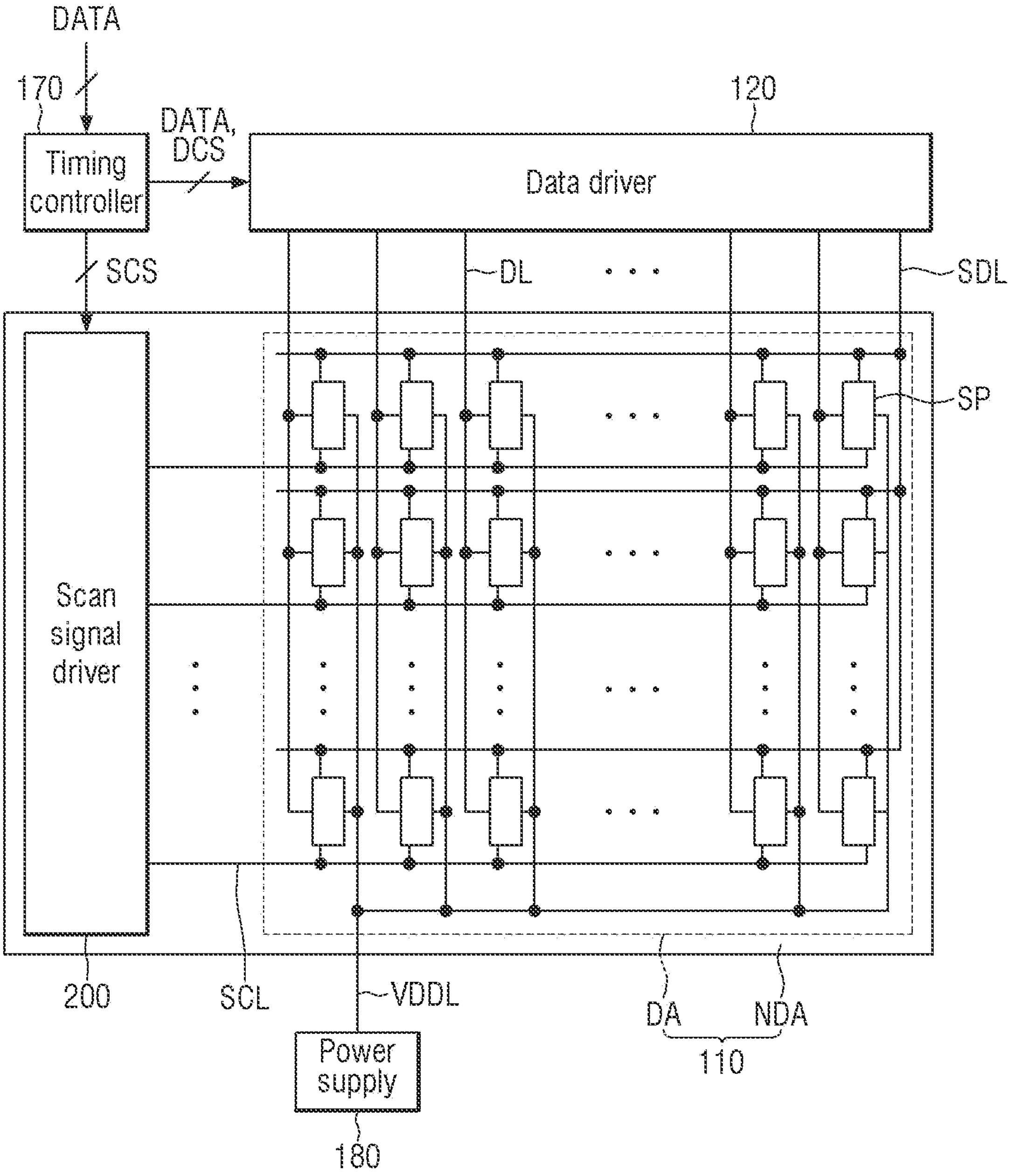
FIG. 3 is a block diagram showing a display device according to an embodiment of the present disclosure.

FIG. 1 is a perspective view of a display device according to an embodiment of the present disclosure. FIG. 2 is a plan view showing a display device according to an embodiment of the present disclosure. FIG. 3 is a block diagram showing a display device according to an embodiment of the present disclosure.

As used herein, the terms "above," "top" and "upper surface" refer to an upper side of the display panel 110 (e.g., the side indicated by the arrow in the z-axis direction), whereas the terms "below," "bottom" and "lower surface" refer to a lower side of the display panel 110 (e.g., the opposite side in the z-axis direction). As used herein, the terms "left side," "right side," "upper side", and "lower side" indicate relative positions when the display panel 110 is viewed from the top. For example, the "left side" refers to the opposite direction indicated by the arrow of the x-axis, the "right side" refers to the direction indicated by the arrow of the x-axis, the "upper side" refers to the direction indicated by the arrow of the y-axis, and the "lower side" refers to the opposite direction indicated by the arrow of the y-axis.

A display device according to an embodiment of the present disclosure may be used as the display screen of various suitable portable electronic devices that display video or still images, such as a mobile phone, a smart phone, a tablet PC, a smart watch, a watch phone, a mobile communications terminal, an electronic notebook, an electronic book, a portable multimedia player (PMP), a navigation device, and an ultra-mobile PC (UMPC). In addition, the display device according to an embodiment of the present disclosure may be used as the display screen of various suitable middle-sized or large-sized display devices, such as a television, a laptop computer, a monitor, an electronic billboard, and the Internet of Things (IOT) device. Hereinafter, for convenience, the display device according to an embodiment of the present disclosure may be described in the context of a middle-sized or large-sized display device including a plurality of source drivers 121. However, the present disclosure is not limited thereto.

The display device may be a small-sized display device including a single source driver 121, and may include no flexible film 122, no source circuit board 140, or no first cable 150. In addition, when the display device is a small-sized display device, a source driver 121 and a timing controller 170 may be integrated with each other into a single integrated circuit, and disposed on a circuit board 160 or attached on a first substrate 111 of a display panel 110. Examples of the middle-sized or large-sized display devices include monitors, television sets, and the like, and examples of small-sized display devices include smart phones, tablet PCs, and the like.

Referring to FIGS. 1, 2, and 3, the display device includes a display panel 110, a data driver 120 including source drivers 121, flexible films 122, source circuit boards 140, first cables 150, a scan signal driver 200, a control circuit board 160, a timing controller 170, and a power supply 180.

The display panel 110 may have a rectangular shape when viewed from the top (e.g., in a plan view). For example, the display panel 110 may have a rectangular shape having longer sides extending in the first direction (x-axis direction) and shorter sides extending in the second direction (y-axis direction) when viewed from the top (e.g., in a plan view). The corners where the shorter sides extending in the first direction (x-axis direction) meet the longer sides extending in the second direction (y-axis direction) may be right angled or may be rounded with a suitable curvature (e.g., a predetermined curvature). The shape of the display panel 110 when viewed from the top (e.g., in a plan view) is not limited to a rectangular shape, but may be formed in a different polygonal shape, a circular shape, or an elliptical shape. In addition, although the display panel 110 is formed to be flat or substantially flat in FIGS. 1 and 2, the present disclosure is not limited thereto. The display panel 110 may include a curved portion that is bent at a suitable curvature (e.g., a predetermined curvature).

The display panel 110 may include a first substrate 111 and a second substrate 112. The second substrate 112 may be disposed such that it faces the first substrate 111. The first substrate 111 and the second substrate 112 may be either rigid or flexible. The first substrate 111 may be made of glass or plastic. The second substrate 112 may be formed of glass, plastic, an encapsulation film, or a barrier layer. As another example, the second substrate 112 may be omitted as needed or desired.

The display panel 110 may be an organic light-emitting display panel including organic light-emitting diodes, a quantum-dot light-emitting display panel including a quantum-dot light-emitting layer, an inorganic light-emitting display panel including an inorganic semiconductor, or a micro light-emitting display panel including micro light-emitting diodes (LED). Hereinafter, for convenience an organic light-emitting display panel is described in more detail as the display panel 110. However, the present disclosure is not limited thereto.

The display panel 110 may be divided into a display area DA where sub-pixels SP are arranged to display images, and a non-display area NDA which is a peripheral area of the display area DA. In the display area DA, the sub-pixels SP, and scan signal lines SCL, data lines DL, sensing lines SDL, and supply voltage lines VDDL connected to the sub-pixels SP may be disposed. The scan signal lines SCL may be extended in the first direction (x-axis direction) in the display area DA. The data lines DL may be extended in the second direction (y-axis direction) crossing the first direction (x-axis direction) in the display area DA. The sensing lines SDL may be extended in the first direction (x-axis direction), and the supply voltage line VDDL may be extended in the second direction (y-axis direction), in the display area DA.

Each of the sub-pixels SP may be connected to one of the scan signal lines SCL, one of the data lines DL, the sensing line SDL, and the supply voltage line VDDL. In the example shown in FIG. 3, each of the sub-pixels SP is connected to one scan signal line SCL and one data line DL, but the present disclosure is not limited thereto. The sub-pixels SP may be commonly connected to the sensing line SDL and the supply voltage line VDDL.

Each of the sub-pixels SP may include a switching transistor, a driving transistor, a sensing transistor, a capacitor, and a light-emitting element. The switching transistor may be turned on when a scan signal and a sensing signal are applied from the scan signal lines SCL, and the data voltage input to the data lines DL during a scan signal input period is applied to the gate electrode of the driving transistor. When the data voltage is applied to the gate electrode, the driving transistor may supply a driving current to the light-emitting element, so that light may be emitted.

The driving transistor, the switching transistor, and the sensing transistor may be thin-film transistors. The light-emitting element may emit light in proportion to the driving current from the driving transistor. The light-emitting element may be an organic light-emitting diode including a first electrode, an organic emissive layer, and a second electrode. The capacitor may keep the data voltage that is applied to the gate electrode of the driving transistor DT constant or substantially constant. The structure and operating characteristics of the sub-pixels SP will be described in more detail below.

The non-display area NDA may be defined as the area from the outer side of the display area DA to an edge of the display panel 110. The scan signal driver 200 may be disposed in the non-display area NDA to apply scan signals to the scan signal lines SCL.

The scan signal driver 200 outputs scan signals to the scan signal lines SCL during the active period of each frame in response to the scan control signal SCS from the timing controller 170, and selectively outputs sensing signals to the scan signal lines SCL during a vertical blank period. The scan control signals SCS may include a start signal, scan clock signals, a line select signal, a holding control signal, and a reset signal.

The scan signal driver 200 generates the scan signals in response to the start signal and the scan clock signals during the active period of each frame, and sequentially outputs the scan signals to the respective scan signal lines SCL. In addition, during the vertical blank period of each frame, the scan signal driver 200 selectively generates the sensing signals in response to the line select signal, the holding control signal, and the scan clock signals, and selectively outputs the sensing signals to the scan signal lines SCL. The scan signal driver 200 is reset by the reset signal after outputting the sensing signals.

The scan signal driver 200 is formed on opposite sides of the display area DA, for example, such as in the non-display area NDA on the left and right sides of the display area DA as shown in the example of FIG. 2, but the present disclosure is not limited thereto. For example, the scan signal driver 200 may be formed in the non-display area NDA on one side of the display area DA (e.g., on the left side or the right side of the display area DA).

One end of each of the flexible films 122 may be attached on a first surface of the first substrate 111 of the display panel 110, while the other end thereof may be attached on a surface of a corresponding one of the source circuit boards 140. In more detail, because the second substrate 112 is smaller than the first substrate 111, one side of the first substrate 111 may not be covered by the second substrate 112 and may be exposed. The flexible films 122 may be attached to the side of the first substrate 111 that is exposed without being covered by the second substrate 112. Each of the flexible films 122 may be attached to the first surface of the first substrate 111 and the surface of the corresponding one of the source circuit boards 140 using an anisotropic conductive layer.

Each of the flexible films 122 may be a tape carrier package or a flexible film, such as a chip-on-film. The flexible films 122 may be bent, so that they are located below the rear surface of the first substrate 111. Then, the source circuit boards 140, the first cables 150, and the control circuit board 160 may be disposed on the rear surface of the display panel 110. Although FIGS. 1 and 2 illustrate that eight flexible films 122 are attached on the first substrate 111 of the display panel 110, the number of the flexible films 122 is not limited to eight.

The source drivers 121 of the data driver 120 may be disposed on surfaces of the flexible films 122, respectively. Each of the source drivers 121 may be implemented as an integrated circuit (IC). The data driver 120 converts the digital video data DATA into analog data voltages in response to a source control signal DCS from the time controller 170, and supplies the analog data voltages to the data lines DL of the display panel 100 through the flexible films 122.

The source circuit boards 140 may be connected to the control circuit board 160 via the first cables 150. Each of the source circuit boards 140 may include first connectors 151 for connecting to the first cables 150. Each of the source circuit boards 140 may be a flexible printed circuit board or a printed circuit board. The first cables 150 may be flexible cables. As another example, the source drivers 121 may be mounted on the source circuit boards 140 or the control circuit board 160 or the first substrate 111 of the display panel 110 by a chip on glass (COG) technique. Accordingly, the configuration of the source drivers 121 is not limited to that of FIGS. 1 and 2, and may be variously modified as needed or desired.

The control circuit board 160 may be connected to the source circuit boards 140 via the first cables 150. As such, the control circuit board 160 may include second connectors 152 for connecting to the first cables 150. The control circuit board 160 may be a flexible printed circuit board or a printed circuit board.

Although four first cables 150 connect the source circuit boards 140 with the control circuit board 160 in the example shown in FIGS. 1 and 2, the number of the first cables 150 is not limited to four. In addition, although two source circuit boards 140 are shown in FIGS. 1 and 2, the number of the source circuit boards 140 is not limited two.

In addition, when there are a smaller number of the flexible films 122, the source circuit boards 140 may be omitted. For example, the flexible films 122 may be connected directly to the control circuit board 160.

The timing controller 170 may be disposed on one surface of the control circuit board 160. The timing controller 170 may be implemented as an integrated circuit. The timing controller 170 receives digital video data and timing signals from a system-on-chip of the system circuit board. The timing controller 170 may generate the source control signal DCS for controlling the driving timing of the source drivers 121 of the data driver 120, and the scan control signals SCS for controlling the driving timing of the scan signal driver 200, according to the timing signals. The timing controller 170 may output the scan control signals SCS to the scan signal driver 200, and may output the digital video data DATA and the source control signal DCS to the data driver 120.

The power supply 180 may generate a first supply voltage to supply to the supply voltage line VDDL. In addition, the power supply 180 may supply a second supply voltage to the cathode electrode of the organic light-emitting diode included in each of the sub-pixels SP. The first supply voltage may be a high-level voltage that is equal to or substantially equal to a gate-on voltage for turning on the organic light-emitting diodes and the transistors. The second supply voltage may be a low-level voltage that is equal to or substantially equal to a gate-off voltage for turning off the organic light-emitting diodes and the transistors. For example, the first driving voltage may have a higher level than that of the second driving voltage.

Figure 4:
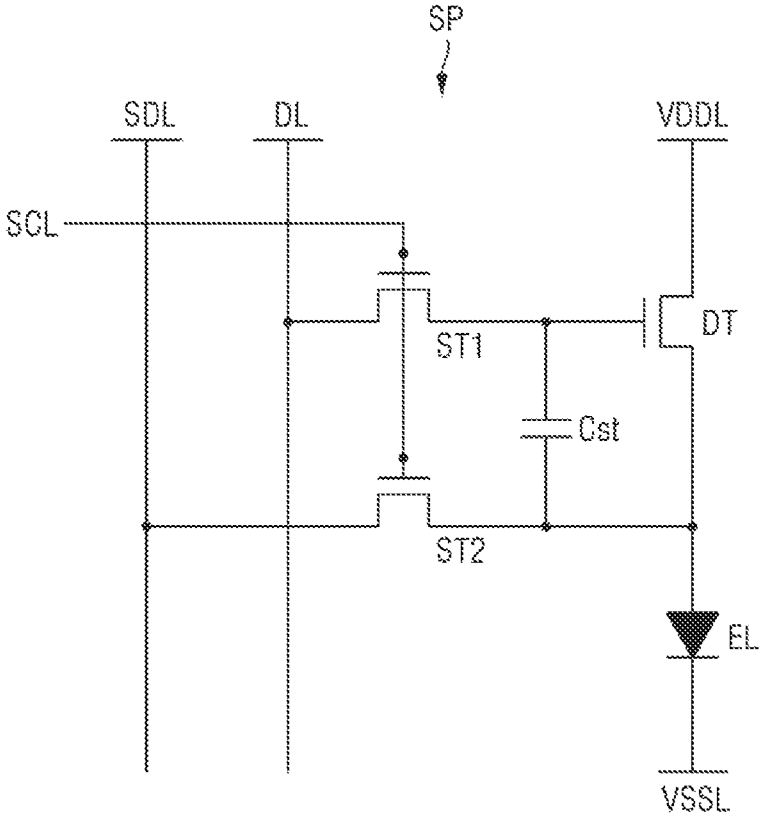
FIG. 4 is a circuit diagram showing a sub-pixel according to an embodiment of the present disclosure.

FIG. 4 is a circuit diagram showing a sub-pixel according to an embodiment of the present disclosure.

Referring to FIG. 4, a sub-pixel SP may include a light-emitting element EL, a driving transistor DT, a switching transistor ST1, a sensing transistor ST2, and a storage capacitor Cst.

The light-emitting element EL emits light proportional to the driving current supplied through the driving transistor DT. The light-emitting element EL may be, but is not limited to, an organic light-emitting diode. For example, the light-emitting element EL may be a quantum-dot light-emitting diode, an inorganic light-emitting diode, or a micro light-emitting diode. When the light-emitting element EL is an organic light-emitting diode, it may include an anode electrode, a hole transporting layer, an organic light-emitting layer, an electron transporting layer, and a cathode electrode. In the light-emitting element EL, when a voltage is applied to the anode electrode and the cathode electrode, holes and electrons move to the organic light-emitting layer through the hole transporting layer and the electron transporting layer, respectively, and combine with each other in the organic light-emitting layer to emit light. The anode electrode of the light-emitting element EL may be connected to the source electrode of the driving transistor DT, and the cathode electrode may be connected to a second supply voltage line from which a low-level voltage lower than the high-level voltage is applied.

The driving transistor DT adjusts an electric current flowing from the supply voltage line VDDL from which the first supply voltage is supplied to the light-emitting element EL according to the voltage difference between the gate electrode and the source electrode. The gate electrode of the driving transistor DT may be connected to a first electrode of the first switching transistor ST1, the source electrode thereof may be connected to the anode electrode of the light-emitting element EL, and the drain electrode thereof may be connected to the supply voltage line VDDL from which a high-level voltage is applied.

The switching transistor ST1 is turned on by a scan signal and a sensing signal input through the scan signal line SCL to connect the data line DL with the gate electrode of the driving transistor DT. The gate electrode of the switching transistor ST1 may be connected to the scan signal line SCL, the first electrode thereof may be connected to the gate electrode of the driving transistor DT, and the second electrode thereof may be connected to the data line DL. The switching transistor ST1 is turned on by the scan signal during the active period when the data voltage is input to the data line DL, and supplies the data voltage to the gate electrode of the driving transistor DT. However, the switching transistor ST1 may not apply the data voltage to the gate electrode of the driving transistor DT, even if it is turned on by the sensing signal during the vertical blank period, when the data voltage is not applied.

Like the switching transistor ST1, the sensing transistor ST2 is turned on by the scan signal and the sensing signal input through the scan signal line SCL. The gate electrode of the sensing transistor ST2 may be connected to the scan signal line SCL, the first electrode thereof may be connected to the sensing line SDL, and the second electrode thereof may be connected to the anode electrode of the light-emitting element EL. During the active period when the data voltage is applied to the data line DL, the sensing line SDL remains open by the data driver 120. Therefore, even if the sensing transistor ST2 is turned on by the scan signal in the active period, the output voltage or current of the driving transistor DT may not be output to the sensing line SDL. However, in the vertical blank period, which is a non-image display period, the sensing line SDL and the data driver 120 forms a short-circuit by the data driver 120. Accordingly, when the sensing transistor ST2 is turned on by the sensing signal during the vertical blank period, the output current of the light-emitting element EL is supplied to the data driver 120 through the sensing line SDL. The data driver 120 may perform an external compensation operation during the active period by sensing the output currents of the driving transistors DT input through the sensing lines SDL during the vertical blank period.

One of the first electrode or the second electrode of each of the switching transistor ST1 and the sensing transistor ST2 may be a source electrode, and the other one may be a drain electrode.

The storage capacitor Cst may be formed between the gate electrode and the source electrode of the driving transistor DT. The storage capacitor Cst stores a difference voltage between the gate voltage and the source voltage of the driving transistor DT to maintain or substantially maintain the driving current output of the driving transistor DT during each frame.

Although each of the driving transistor DT, the switching transistor ST1, and the sensing transistor ST2 is implemented as an n-type MOSFET (metal oxide semiconductor field effect transistor) in the example shown in FIG. 4, the present disclosure is not limited thereto. Each of the driving transistor DT, the switching transistor ST1, and the sensing transistor ST2 may be implemented as a p-type MOSFET.

Figure 5:
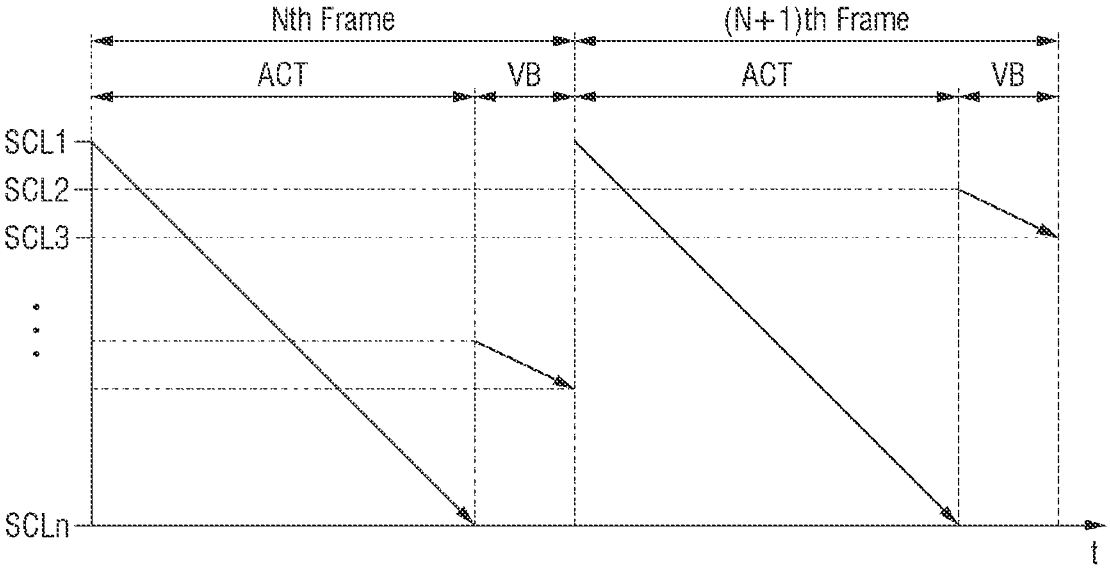
FIG. 5 is a graph showing a driving timing of sub-pixels in an $n^{th}$ frame and an $(n+1)^{th}$ frame.

FIG. 5 is a graph showing a driving timing of sub-pixels in an $n^{th}$ frame and an $(n+1)^{th}$ frame.

Referring to FIG. 5, each of the $n^{th}$ frame and the $(n+1)^{th}$ frame includes an active period ACT and a vertical blank period VB, where n is a positive integer. In the active period ACT, a data voltage is applied to each of the sub-pixels SP to display an image. The vertical blank period VB is a sensing period, in which the output currents from the driving transistors DT of the sub-pixels SP connected to the scan signal lines SCL, respectively, are sensed through the sensing lines SDL.

The active period ACT may be longer than the vertical blank period VB. The vertical blank period VB of the $n^{th}$ frame, which is the sensing period, may be located between the active period ACT of the $n^{th}$ frame and the active period ACT of the $(n+1)^{th}$ frame.

The data driver 120 may provide compensation data voltages, in which electron mobility of the driving transistor DT of each of the sub-pixels SP is compensated for, to the data lines DL during the active period ACT. In addition, the data driver 120 may apply data voltages for sensing to the data lines DL during the vertical blank period VB, in order to compensate for the electron mobility of the driving transistor DT of each of the sub-pixels SP.

Figure 6:
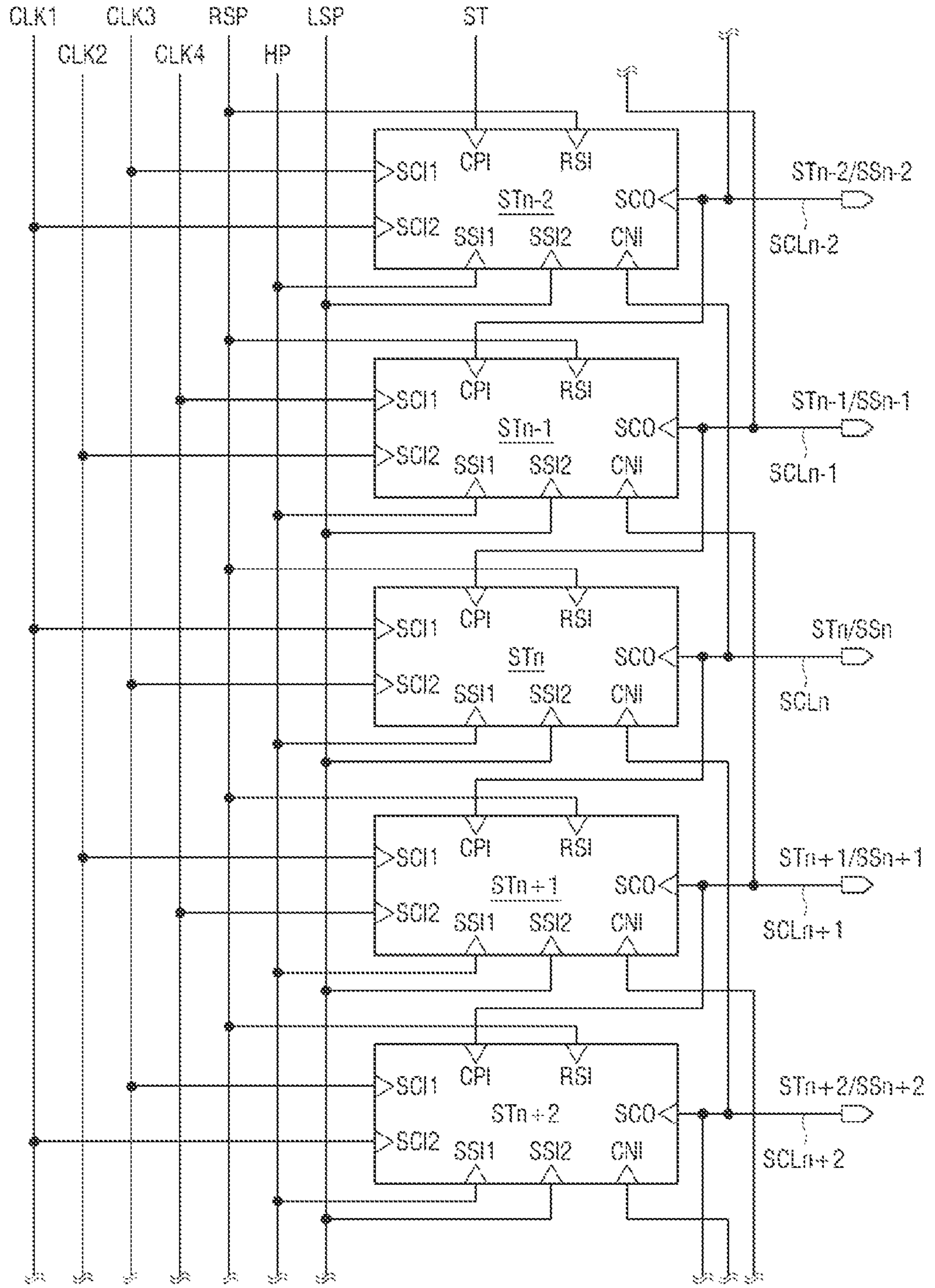
FIG. 6 is a view showing an example of a scan signal driver according to an embodiment of the present disclosure.

FIG. 6 is a view showing an example of a scan signal driver according to an embodiment of the present disclosure.

In FIG. 6, $(n-2)^{th}$ to $(n+2)^{th}$ stages ST(n−2) to ST(n+2) are shown with respect to an $n^{th}$ stage STn, for convenience of illustration, where n is a positive integer.

As used hereinafter, previous stages refer to the stages located before the $n^{th}$ stage STn. Subsequent stages refer to the stages located after the $n^{th}$ stage STn. For example, the previous stages before the $n^{th}$ stage STn refer to the $(n-2)^{th}$ and (n−1)$^{th}$ stages ST(n−2) and ST(n−1), and the subsequent stages after the n$^{th}$ stage STn refer to the (n+1)$^{th}$ and (n+2)$^{th}$ stages ST(n+1) and ST(n+2).

Scan clock lines from which scan clock signals CLK1 to CLK4 having sequentially delayed phases from one another are respectively applied, and sensing control lines from which a line select signal LSP, a holding control signal HP, and a reset signal RSP are respectively applied, may be disposed on one side of the (n−2)$^{th}$ to (n+2)$^{th}$ stages ST(n−2) to ST(n+2). In addition, a start control line from which a start signal ST is applied may be further disposed.

The scan clock signals CLK1 to CLK4, the line select signal LSP, the holding control signal HP, the start signal ST, and the reset signal RSP may be the scan control signals SCS described above with reference to FIG. 2. Although there are four scan clock lines and three sensing control lines in the example shown in FIG. 6, the number of scan clock lines and the number of sensing control lines are not limited thereto.

The scan signal driver 200 includes the (n−2)$^{th}$ to (n+2)$^{th}$ stages ST(n−2) to ST(n+2) respectively connected to the scan signal lines SCL. In the active period ACT, the (n−2)$^{th}$ stage ST(n−2) outputs the (n−2)$^{th}$ scan signal SC(n−2) to the (n−2)$^{th}$ scan signal line SCL(n−2), and the (n−1)$^{th}$ stage ST(n−1) outputs the (n−1)$^{th}$ scan signal SC(n−1) to the (n−1)$^{th}$ scan signal line SCL(n−1). Accordingly, the n$^{th}$ stage STn may output the n$^{th}$ scan signal SCn to the n$^{th}$ scan signal line SCLn during the active period ACT. Subsequently, the (n+1)$^{th}$ stage ST(n+1) outputs the (n+1)$^{th}$ scan signal SC(n+1) to the (n+1)$^{th}$ scan signal line SCL(n+1), and the (n+2)$^{th}$ stage ST(n+2) outputs the (n+2)$^{th}$ scan signal SC(n+2) to the (n+2)$^{th}$ scan signal line SCL(n+2).

In addition, the (n−2)$^{th}$ stage ST(n−2) outputs the (n−2)$^{th}$ sensing signal SS(n−2) to the (n−2)$^{th}$ scan signal line SCL (n−2), and the (n−1)$^{th}$ stage ST(n−1) outputs the (n−1)$^{th}$ sensing signal SS(n−1) to the (n−1)$^{th}$ scan signal line SCL (n−1) in the vertical blank period VB, which is the sensing period. Accordingly, the n$^{th}$ stage STn may output the n$^{th}$ sensing signal SSn to the n$^{th}$ scan signal line SCLn during the vertical blank period VB. Subsequently, the (n+1)$^{th}$ stage ST(n+1) outputs the (n+1)$^{th}$ sensing signal SS(n+1) to the (n+1)$^{th}$ scan signal line SCL(n+1), and the (n+2)$^{th}$ stage ST(n+2) outputs the (n+2)$^{th}$ sensing signal SS(n+2) to the (n+2)$^{th}$ scan signal line SCL(n+2).

Each of the (n−2)$^{th}$ to (n+2)$^{th}$ stages ST(n−2) to ST(n+2) includes a previous-stage carry terminal CPI, a subsequent-stage carry terminal CNI, a first scan clock terminal SCI1, a second scan clock terminal SCI2, a first sensing clock terminal SSI1, a second sensing clock terminal SSI2, a reset terminal RSI, and a scan output terminal SCO.

When the (n−2)$^{th}$ stage ST(n−2) is the first stage, the start signal ST of the start signal line may be input to the previous-stage carry terminal CPI of the (n−2)th stage ST(n−2). Each of the stages, which are cascaded after the first stage, may have a previous stage carry terminal CPI connected to a scan output terminal SCO of an immediately previous stage. For example, as shown in FIG. 6, the previous-stage carry terminal CPI of the n$^{th}$ stage STn may be connected to the scan output terminal SCO of the (n−1)$^{th}$ stage ST(n−1).

The subsequent-stage carry terminal CNI of each of the (n−2)$^{th}$ to (n+2)th stages ST(n−2) to ST(n+2) may be connected to the scan output terminal SCO of one of the subsequent stages. For example, as shown in FIG. 6, the subsequent-stage carry terminal CNI of the n$^{th}$ stage STn may be connected to the scan output terminal SCO of the (n+2)$^{th}$ stage ST(n+2), and may receive the scan signal SC(n+2) of the (n+2)$^{th}$ stage ST(n+2) as the subsequent carry signal.

The scan output terminals SCO of the (n−2)$^{th}$ to (n+2)$^{th}$ stages ST(n−2) to ST(n+2) are sequentially connected to the respective scan signal lines SCL. Accordingly, the scan signal lines SCL may be connected to the scan output terminals SCO of the stages ST(n−2) to ST(n+2), respectively. For example, as shown in FIG. 6, the (n−1)$^{th}$ scan signal line SCL(n−1) is connected to the scan output terminal SCO of the (n−1)$^{th}$ stage ST(n−1), and the n$^{th}$ scan signal line SCLn is connected to the scan output terminal SCO of the n$^{th}$ stage STn. In addition, the (n+1)$^{th}$ scan signal line SCL(n+1) may be connected to the scan output terminal SCO of the (n+1)$^{th}$ stage ST(n+1).

The first sensing clock terminal SSI1 of each of the (n−2)$^{th}$ to (n+2)$^{th}$ stages ST(n−2) to ST(n+2) receives the holding control signal HP through the sensing control line. In addition, the second sensing clock terminal SSI2 of each of the (n−2)$^{th}$ to (n+2)th stages ST(n−2) to ST(n+2) receives the line select signal LSP through the sensing control line. In addition, the reset terminal RSI of each of the (n−2)$^{th}$ to (n+2)$^{th}$ stages ST(n−2) to ST(n+2) receives the reset signal RSP through the sensing control line.

Each of the (n−2)$^{th}$ to (n+2)$^{th}$ stages ST(n−2) to ST(n+2) receives two scan clock signals from among the scan clock signals CLK1 to CLK4 having sequentially delayed phases from one another through the first scan clock terminal SCI1 and the second scan clock terminal SCI2. For example, the (n−2)$^{th}$ stage ST(n−2) may receive a third scan clock signal CLK3 through the first scan clock terminal SCI1 and a first scan clock signal CLK1 through the second scan clock terminal SCI2. The (n−1)th stage ST(n−1) may receive a fourth scan clock signal CLK4 through the first scan clock terminal SCI1 and a second scan clock signal CLK2 through the second scan clock terminal SCI2. The n$^{th}$ stage STn may receive the first scan clock signal CLK1 through the first scan clock terminal SCI and the third scan clock signal CLK3 through the second scan clock terminal SCI2. The (n+1)$^{th}$ stage ST(n+1) may receive the second scan clock signal CLK2 through the first scan clock terminal SCI and the fourth scan clock signal CLK4 through the second scan clock terminal SCI2. The (n+2)$^{th}$ stage ST(n+2) may receive the third scan clock signal CLK3 through the first scan clock terminal SCI1 and the first scan clock signal CLK1 through the second scan clock terminal SCI2.

The (n−2)$^{th}$ to (n+2)$^{th}$ stages ST(n−2) to ST(n+2) sequentially output scan signals SC(n−2) to SC(n+2) to the respective scan signal lines SCL(n−2) to SCL(n+2) connected thereto through their scan output terminals SCO. For example, during the active period ACT, the (n−2)$^{th}$ stage ST(n−2) outputs the (n−2)$^{th}$ scan signal SC(n−2) to the (n−2)$^{th}$ scan signal line SCL(n−2) connected to the scan output terminal SCO. Subsequently, the (n−1)$^{th}$ stage ST(n−1) outputs the (n−1)$^{th}$ scan signal SC(n−1) to the (n−1)$^{th}$ scan signal line SCL(n−1) connected to the scan output terminal SCO. Accordingly, the n$^{th}$ stage STn outputs the n$^{th}$ scan signal SCn to the n$^{th}$ scan signal line SCLn connected to the scan output terminal SCO. Subsequently, the (n+1)$^{th}$ stage ST(n+1) outputs the (n+1)$^{th}$ scan signal SC(n+1) to the (n+1)$^{th}$ scan signal line SCL(n+1) connected to the scan output terminal SCO, and the (n+2)$^{th}$ stage ST(n+2) outputs the (n+2)$^{th}$ scan signal SC(n+2) to the (n+2)$^{th}$ scan signal line SCL(n+2) connected to the scan output terminal SCO.

In addition, during the sensing period of the vertical blank period VB, the (n−2)$^{th}$ stage ST(n−2) outputs the (n−2)$^{th}$ sensing signal SS(n−2) to the (n−2)$^{th}$ scan signal line SCL (n−2) connected to the scan output terminal SCO, and the $(n-1)^{th}$ stage ST(n−1) outputs the $(n-1)^{th}$ sensing signal SS(n−1) to the $(n-1)^{th}$ scan signal line SCL(n−1) connected to the scan output terminal SCO. Accordingly, the $n^{th}$ stage STn outputs the $n^{th}$ sensing signal SSn to the $n^{th}$ scan signal line SCLn connected to the scan output terminal SCO. Subsequently, the $(n+1)^{th}$ stage ST(n+1) outputs the $(n+1)^{th}$ sensing signal SS(n+1) to the $(n+1)^{th}$ scan signal line SCL (n+1) connected to the scan output terminal SCO, and the $(n+2)^{th}$ stage ST(n+2) outputs the $(n+2)^{th}$ sensing signal SS(n+2) to the $(n+2)^{th}$ scan signal line SCL(n+2) connected to the scan output terminal SCO.

In general, the scan signal driver 200 may include the stages ST1 to STn that sequentially output the first to $n^{th}$ scan signals SCI to SCn during the active period ACT, and randomly output at least one of the first to $n^{th}$ sensing signals SSI to SSn during the vertical blank period VB, which is a sensing period. With this configuration, it may be possible to reduce the area of the scan signal driver 200 when compared to a scan signal driver that includes stages for generating and outputting the first to $n^{th}$ scan signals and separate stages for generating and outputting the first to $n^{th}$ sensing signals.

Figure 7:
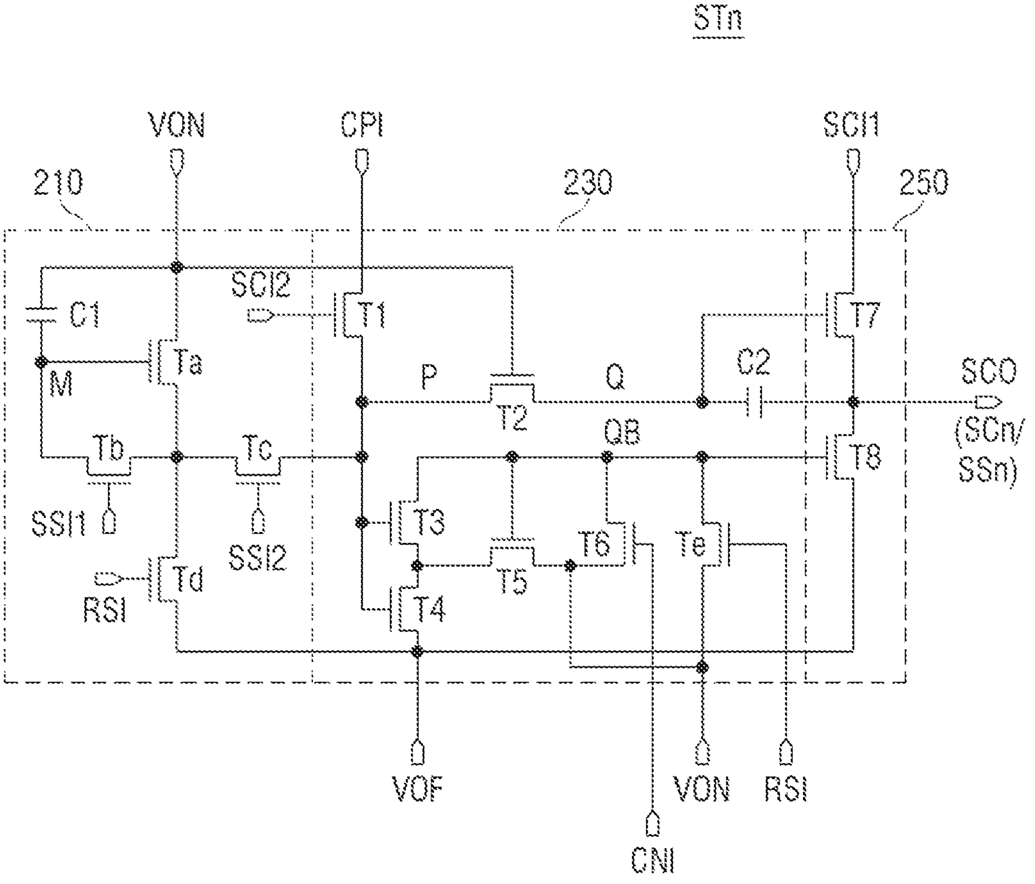
FIG. 7 is a circuit diagram showing the $n^{th}$ stage of the scan signal driver shown in FIG. 6 in more detail.

FIG. 7 is a circuit diagram showing the $n^{th}$ stage of the scan signal driver shown in FIG. 6 in more detail.

Referring to FIG. 7, the $n^{th}$ stage STn includes a sensing control unit (e.g., a sensing control circuit) 210, an output node control unit (e.g., an output node control circuit) 230, and an output unit (e.g., an output circuit) 250. In addition, the $n^{th}$ stage STn further includes a gate-on terminal VON from which a gate-on voltage is applied, and a gate-off terminal VOF from which a gate-off voltage is applied.

The $n^{th}$ stage STn may operate by receiving a start signal ST through the previous-stage carry terminal CPI, or may operate by receiving the $(n-1)^{th}$ scan signal SC(n−1) from the previous $(n-1)^{th}$ ST(n−1), as a carry signal when it is cascaded to the $(n-1)^{th}$ stage ST(n−1). Hereinafter, an example will be described in which the $n^{th}$ stage STn is one of the stages cascaded to the previous $(n-1)^{th}$ stage ST(n−1).

The sensing control unit 210 of the $n^{th}$ stage STn supplies a gate-on voltage to a sensing control node M during an active period ACT, and maintains the voltage of the sensing control node M at the gate-on voltage. In addition, by supplying the gate-on voltage of the sensing control node M to a pull-up node Q of the output node control unit 230 during a vertical blank period VB, which is a sensing period, the output unit 250 outputs the $n^{th}$ sensing signal SSn during the sensing period.

For example, when a line select signal LSP and a holding control signal HP are input while an output node P of the output node control unit 230 is maintained at the gate-on voltage during the active period ACT, the sensing control unit 210 supplies the gate-on voltage to the sensing control node M in response to the line select signal LSP and the holding control signal HP. In addition, the sensing control unit 210 maintains the voltage of the sensing control node M at the gate-on voltage, and supplies the gate-on voltage of the sensing control node M to the pull-up node Q of the node control unit 230 in response to the line select signal LSP input during the vertical blank period VB, which is the sensing period. In addition, the sensing control unit 210 interrupts the voltage output of the sensing control node M when a reset signal RSP is input during the sensing period.

The sensing control unit 210 includes first to fourth sensing transistors Ta, Tb, Tc, and Td, and a first capacitor C1.

A gate electrode and a first electrode of the first sensing transistor Ta are connected to the gate-on terminal VON to form the first capacitor C1 between the first electrode and the gate electrode.

A first electrode of the second sensing transistor Tb is connected to the gate electrode of the first sensing transistor Ta to form the sensing control node M, and the second electrode thereof is connected to the second electrode of the first sensing transistor Ta. The gate electrode of the second sensing transistor Tb is connected to the first sensing clock terminal SSI1, so that the second sensing transistor Tb is turned on or off in response to the holding control signal HP.

A first electrode of the third sensing transistor Tc is connected to the second electrodes of the first and second sensing transistors Ta and Tb, and a second electrode thereof is connected to the output node P of the output node control unit 230. Accordingly, the second electrode may be electrically connected to the pull-up node Q. The gate electrode of the third sensing transistor Tc is connected to the second sensing clock terminal SSI2, so that the third sensing transistor Tc is turned on or off in response to the line select signal LSP.

The second and third sensing transistors Tb and Tc are turned on in response to the line select signal LSP and the holding control signal HP, respectively, which are concurrently (e.g., simultaneously or substantially simultaneously) input with each other during the active period ACT, so that the gate-on voltage of the gate-on terminal VON is supplied to the sensing control node M during the active period ACT.

By virtue of the connection structure of the third sensing transistor Tc (e.g., the structure in which the first electrode of the third sensing transistor Tc is connected to the second electrodes of the first and second sensing transistors Ta and Tb) and the second electrode is connected to the output node P of the output node control unit 230, the second electrode of the third sensing transistor Tc may be maintained at a voltage equal to or greater than that of the first electrode, while the gate-on voltage of the output node P is maintained. In more detail, while the output node P is maintained at the gate-on voltage, the second electrode of the third sensing transistor Tc connected to the output node P may be maintained at a voltage equal to or greater than the voltage of the sensing control node M. Accordingly, it may be possible to prevent the current flow and depletion mode of the first and second sensing transistors Ta and Tb, and the level of the gate-on voltage supplied to the sensing control node M may be maintained without decreasing.

The third sensing transistor Tc is turned on in response to the line select signal LSP input during the vertical blank period VB, so that the gate-on voltage of the gate-on terminal VON is supplied to the pull-up node Q of the output node control unit 230 through the turned-on first sensing transistor Ta.

The first electrode of the fourth sensing transistor Td is connected to the second electrodes of the first and second sensing transistors Ta and Tb and the first electrode of the third sensing transistor Tc, and the second electrode thereof is connected to the gate-off terminal VOF. The fourth sensing transistor Td is turned on or off in response to the reset signal RSP input to the gate electrode. The fourth sensing transistor Td is turned on in response to the reset signal RSP input during the vertical blank period VB, to electrically connect the first and second sensing transistors Ta and Tb and the sensing control node M with the gate-off terminal VOF.

One of the first electrode or the second electrode of each of the first to fourth sensing transistors Ta, Tb, Tc and Td may be a source electrode, while the other may be a drain electrode.

The output node control unit 230 allows the output unit 250 to be enabled by supplying the voltage equal to the gate-on voltage to the pull-up node Q during the active period ACT, and allows the gate-off voltage of the gate-off terminal VOF to be applied to the pull-down node QB while the pull-up node Q is maintained at the gate-on voltage level.

In more detail, the output node control unit 230 supplies the $(n-1)^{th}$ scan signal SC(n−1) from the previous (n−1) stage ST(n−1) to the pull-up node Q in response to one scan clock signal CLK3 from among the scan clock signals CLK1 to CLK4 input during the active period ACT. In doing so, the scan clock signals CLK1 to CLK4, the start signal ST, and the scan signals SCI to SCn may have gate-on voltage levels.

The output node control unit 230 supplies the gate-on voltage input through the third sensing transistor Tc of the sensing control unit 210 to the pull-up node Q during the sensing period. Similarly, the output node control unit 230 allows the gate-off voltage to be applied to the pull-down node QB while the gate-on voltage is supplied to the pull-up node Q.

The output node control unit 230 includes first to sixth transistors T1 to T6, and a reset transistor Te. One of the first electrode or the second electrode of each of the first to sixth transistors T1 to T6 and the reset transistor Te may be a source electrode, and the other may be a drain electrode.

The first electrode of the first transistor T1 is connected to the previous-stage carry terminal CPI, the second electrode thereof is connected to the output node P, and the gate electrode thereof is connected to the second scan clock terminal SCI2. The first transistor T1 is turned on by at least one scan clock signal CLK3 input during the active period ACT, and supplies a start signal ST or the $(n-1)^{th}$ scan signal SC(n−1) of the previous $(n-1)^{th}$ stage ST(n−1) to the second transistor T2 and the pull-up node Q.

The first electrode of the second transistor T2 is connected to the second electrode of the first transistor T1, the second electrode thereof is connected to the pull-up node Q, and the gate electrode thereof is connected to the gate-on terminal VON to remain turned on by the gate-on voltage. The output node P of the first transistor T1 and the pull-up node Q may be electrically divided and separated from each other by the second transistor T2 disposed in series between the first transistor T1 and the pull-up node Q. As such, it may be possible to prevent the voltage bootstrapped at the pull-up node Q from being reversed and applied to the output node P by virtue of the second transistor T2 working as a diode. In more detail, even if the gate-on voltage is applied to the pull-up node Q and then the voltage at the pull-up node Q is bootstrapped by the first scan clock CLK1 input to the output unit 250, the bootstrapped voltage at the pull-up node Q is not applied to the first transistor T1 or the third and fourth transistors T3 and T4, as well as to the sensing control unit 210. Accordingly, electrical stress of the first, third, and fourth transistors T1, T3, and T4 according to the bootstrapped voltage at the pull-up node Q may be reduced, and a stable switching operation may be performed.

The second capacitor C2 is disposed between the pull-up node Q and the scan output terminal SCO. One electrode of the second capacitor C2 may be connected to the pull-up node Q, and the other electrode thereof may be connected to the scan output terminal SCO. Because the second capacitor C2 stores the voltage difference between the pull-up node Q and the scan output terminal SCO, the voltage difference between the pull-up node Q and the scan output terminal SCO may be held by the second capacitor C2.

The third and fourth transistors T3 and T4 are disposed in series between the pull-down node QB and the gate-off terminal VOF.

The first electrode of the third transistor T3 is connected to the pull-down node QB, and the gate electrode thereof is connected to the second electrode of the first transistor T1, thereby forming the output node P of the first transistor T1.

The first electrode of the fourth transistor T4 is connected to the second electrode of the third transistor T3, the second electrode thereof is connected to the gate-off terminal VOF, and the gate electrode thereof is connected to the second electrode of the first transistor T1 and the gate electrode of the third transistor T3.

The third and fourth transistors T3 and T4 are turned on according to the gate-on voltage of the output node P separated from the pull-up node Q, and the gate-off voltage of the gate-off terminal VOF is applied to the pull-down node QB.

The second electrode of the fifth transistor T5 is connected to the second electrode of the third transistor T3 and a first electrode connection node of the fourth transistor T4. In addition, the first electrode of the fifth transistor T5 is connected to the gate-on terminal VON, and the gate electrode thereof is connected to the pull-down node QB. Accordingly, the fifth transistor T5 is turned on when the gate-on voltage is supplied to the pull-down node QB, so that the gate-on voltage is applied to the second electrode of the third transistor T3 and the first electrode of the fourth transistor T4.

By virtue of the structure of the fifth transistor T5, e.g., the structure in which the first electrode is connected to the gate-on terminal VON and the second electrode is connected to the second electrode of the third transistor T3, so that the gate-on voltage is applied to the second electrode of the third transistor T3 and the first electrode of the fourth transistor T4, it may be possible to prevent the third and fourth transistors T3 and T4 from operating in the depletion mode. The fifth transistor T5 is turned on when the gate-on voltage is supplied to the pull-down node QB, so that the gate-on voltage is applied to the second electrode of the third transistor T3 and the first electrode of the fourth transistor T4. Accordingly, while the third and fourth transistors T3 and T4 are turned off, the third and fourth transistors T3 and T4 do not enter the depletion mode. As a result, the level of the gate-on voltage applied to the pull-down node QB may be maintained without decreasing.

The first electrode of the sixth transistor T6 is connected to the gate-on terminal VON, the second electrode thereof is connected to the pull-down node QB, and the gate electrode thereof is connected to the subsequent-stage carry terminal CNI. The sixth transistor T6 supplies the gate-on voltage to the pull-down node QB in response to the $(n+2)^{th}$ scan signal SC(n+2) of the subsequent $(n+2)^{th}$ stage ST(n+2) input through the subsequent-stage carry terminal CNI. Because the sixth transistor T6 supplies the gate-on voltage to the pull-down node QB in response to the $(n+2)^{th}$ scan signal SC(n+2) of the subsequent $(n+2)^{th}$ stage ST(n+2), the gate-on voltage is supplied to the pull-down node QB during the active period ACT in which the $(n+2)^{th}$ scan signal SC(n+2) from the subsequent stage is input.

The first electrode of the reset transistor Te is connected to the gate-on terminal VON, the second electrode thereof is connected to the pull-down node QB, and the gate electrode thereof is connected to the reset terminal RSI. The reset transistor Te supplies the gate-on voltage to the pull-down node QB in response to the reset signal RSP input through the reset terminal RSI. In other words, the reset transistor Te supplies the gate-on voltage to the pull-down node QB in response to the reset signal RSP during the vertical blank period VB, e.g., the sensing period in which the reset signal RSP is supplied once.

The output unit 250 includes a pull-up transistor T7 and a pull-down transistor T8.

A first electrode of the pull-up transistor T7 is connected to the first scan clock terminal SCI, the gate electrode thereof is connected to the pull-up node Q, and the second electrode thereof is connected to the scan output terminal SCO. The pull-up transistor T7 is turned on by the gate-on voltage Von of the pull-up node Q, and outputs one of the scan clock signals input to the first scan clock terminal SCI1, e.g., the first scan clock signal CLK1, to the scan output terminal SCO. In this manner, the $n^{th}$ scan signal SCn of the gate-on voltage may be supplied to the first scan signal line SCL1.

The first electrode of the pull-down transistor T8 is connected to the scan output terminal SCO, the gate electrode thereof is connected to the pull-down node QB, and the second electrode thereof is connected to the gate off terminal VOF. The pull-down transistor T8 is turned on by the gate-on voltage of the pull-down node QB, and applies the gate-off voltage input to the gate-off terminal VOF to the scan output terminal SCO. In this manner, the $n^{th}$ scan signal line SCLn connected to the scan output terminal SCO may be maintained at the gate-off voltage during the period in which the pull-down transistor T8 is turned on.

Figure 8:
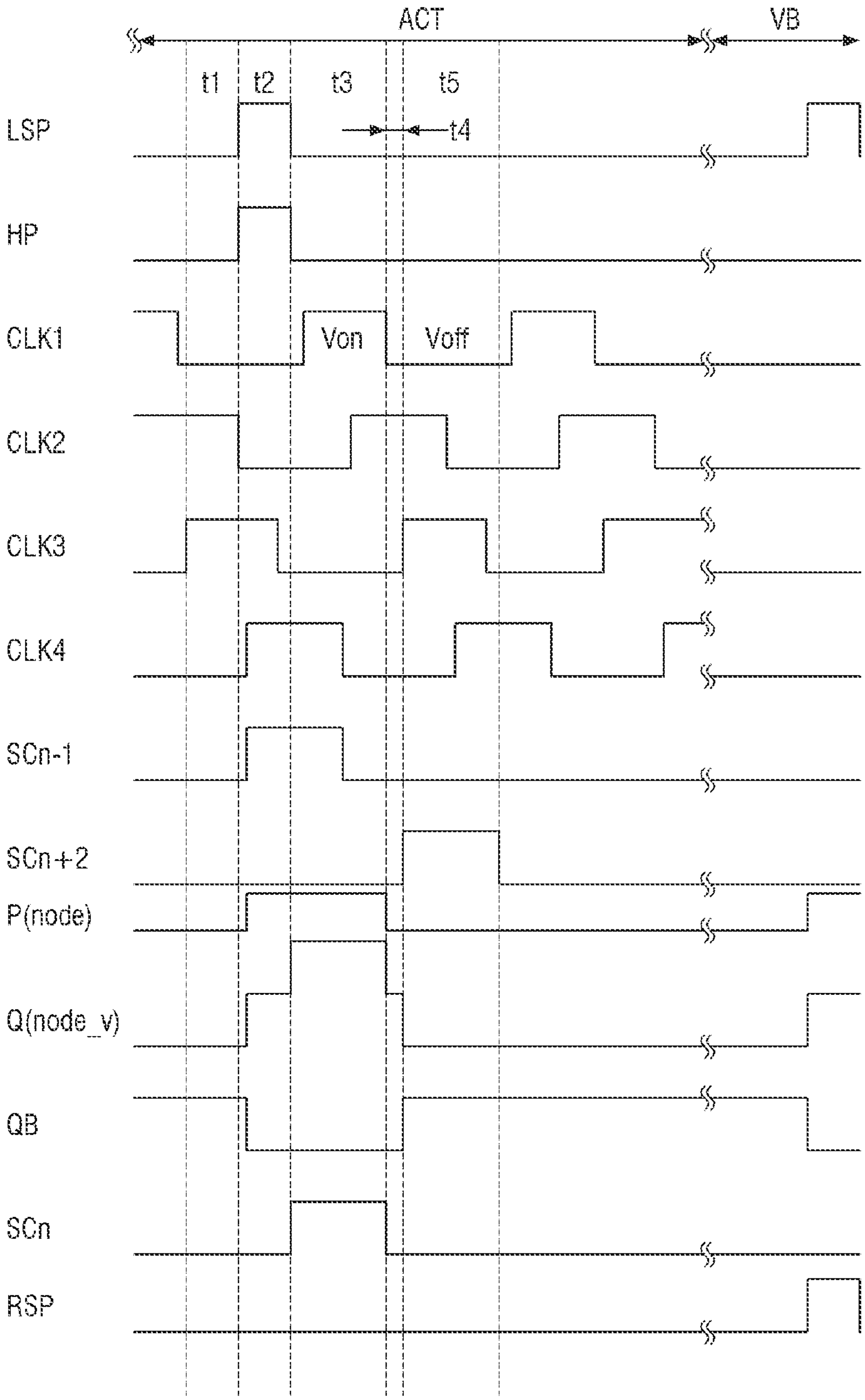
FIG. 8 is a waveform diagram showing sensing control clock signals, scan clock signals, and changes in voltage levels of a pull-up node during an active period of the $n^{th}$ frame.

FIG. 8 is a waveform diagram showing sensing control clock signals, scan clock signals, and changes in voltage levels of a pull-up node during an active period of the $n^{th}$ frame.

Referring to FIG. 8, the line select signal LSP and the holding control signal HP are signals generated at the level of the gate-on voltage Von during one horizontal period 1H. The line select signal LSP and the holding control signal HP may be generated for one horizontal period 1H, so that the gate-on voltage Von may be supplied to the sensing control node M of each of the stages ST(n−2) to ST(n+2) during the active period ACT.

The first to fourth scan clock signals CLK1, CLK2, CLK3, and CLK4 may have (e.g., may be set to) delayed clock signals having different phases from each other. Each of the first to fourth scan clock signals CLK1, CLK2, CLK3, and CLK4 may alternate between the level of the gate-on voltage Von for at least one horizontal period 1H, and the level of the gate—and voltage Voff for at least one horizontal period 1H. For example, each of the first to fourth scan clock signals CLK1, CLK2, CLK3, and CLK4 may be generated at the level of the gate-on voltage Von for two horizontal periods 2H, and may be generated at the level of the gate-off voltage Voff for two horizontal periods 2H. In more detail, as shown in FIG. 8, the period in which the first to fourth scan clock signals CLK1, CLK2, CLK3, and CLK4 are at the gate-on voltage Von may be longer than the period in which they are at the gate-off voltage Voff. Accordingly, the period of the gate-on voltage Von may be longer than the period of the gate-off voltage Voff. However, the period and level of the first to fourth scan clock signals CLK1, CLK2, CLK3, and CLK4 are not limited particularly limited to those described above, and may be variously modified as needed or desired.

For example, the first to fourth scan clock signals CLK1, CLK2, CLK3, and CLK4 may be sequentially input with a delay of one horizontal period 1H, so that they overlap with each other by one horizontal period 1H in that order. In more detail, the period in which the first scan clock signal CLK1 is at the gate-on voltage Von and the period in which the second scan clock signal CLK2 is at the gate-on voltage Von may overlap with each other by one horizontal period 1H. The period in which the second scan clock signal CLK2 is at the gate-on voltage Von and the period in which the third scan clock signal CLK3 is at the gate-on voltage Von may overlap with each other by one horizontal period 1H. The period in which the third scan clock signal CLK3 is at the gate-on voltage Von and the period in which the fourth scan clock signal CLK4 is at the gate-on voltage Von may overlap with each other by one horizontal period 1H. The period in which the fourth scan clock signal CLK4 is at the gate-on voltage Von and the period in which the first scan clock signal CLK1 is at the gate-on voltage Von may overlap with each other by one horizontal period 1H. The first to fourth scan clock signals CLK1, CLK2, CLK3, and CLK4 may be repeated every four stages STn to ST(n+3), e.g., every four scan signal lines SCL.

The first to fourth scan clock signals CLK1, CLK2, CLK3, and CLK4 may not be delayed by exactly one horizontal period 1H, but may be delayed with a suitable or desired margin (e.g., a predetermined margin) that is longer than one horizontal period 1H. When the first to fourth scan clock signals CLK1, CLK2, CLK3, and CLK4 are input with the delay of a period that is longer than one horizontal period 1H to have the suitable margin, the period in which the first scan clock signal CLK1 is at the gate-on voltage Von and the period in which the second scan clock signal CLK2 is at the gate-on voltage Von may overlap with each other by a period shorter than one horizontal period 1H. The period in which the second scan clock signal CLK2 is at the gate-on voltage Von and the period in which the third scan clock signal CLK3 is at the gate-on voltage Von may overlap with each other by a period shorter than one horizontal period 1H. The period in which the third scan clock signal CLK3 is at the gate-on voltage Von and the period in which the fourth scan clock signal CLK4 is at the gate-on voltage Von may overlap with each other by a period shorter than one horizontal period 1H. The period in which the fourth scan clock signal CLK4 is at the gate-on voltage Von and the period in which the first scan clock signal CLK1 is at the gate-on voltage Von may overlap with each other by a period shorter than one horizontal period 1H. Hereinafter, an example in which the first to fourth scan clock signals CLK1, CLK2, CLK3, and CLK4 are delayed by a period longer than one horizontal period 1H will be described in more detail.

The gate-on voltage Von may be a gate-high voltage that may turn on the transistors of the $(n-2)^{th}$ to $(n+2)^{th}$ stages ST(n−2) to ST(n+2) of the scan signal driver 200 and the transistors of the sub-pixels SP. The gate-off voltage Voff may be a gate-off voltage that may turn off the transistors of the $(n-2)^{th}$ to $(n+2)^{th}$ stages ST(n−2) to ST(n+2) of the scan signal driver 200 and the transistors of the sub-pixels SP.

During the active period ACT of each frame (e.g., the $n^{th}$ frame), each of the $(n-2)^{th}$ to $(n+2)^{th}$ stages ST(n−2) to ST(n+2) may be divided into the first to fifth scan periods t1 to t5. Hereinafter, an operation of the $n^{th}$ stage STn during the first to fifth scan periods t1 to t5 of the active period ACT will be described in more detail with reference to FIGS. 8 to 13.

Figure 9:
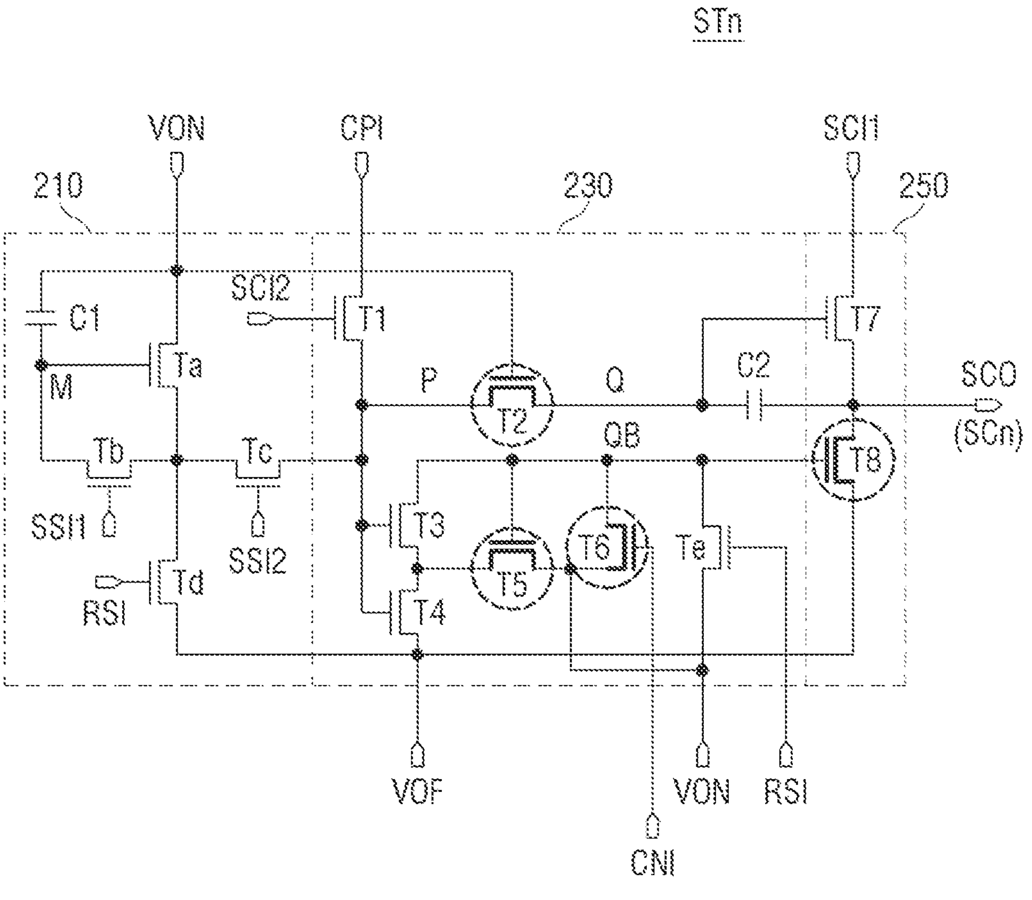
FIG. 9 is a circuit diagram showing an operation of the $n^{th}$ stage in a first scan period of the active period.

FIG. 9 is a circuit diagram showing an operation of the $n^{th}$ stage in a first scan period of the active period.

Referring to FIGS. 8 and 9, in the first scan period t1, which is a scan initialization period, the pull-up node Q of the $n^{th}$ stage STn is maintained at the gate-off voltage Voff, and the pull-down node QB is maintained at the gate-on voltage Von by the subsequent-stage carry signal SC(n+2) input to the subsequent-stage carry terminal CNI. Accordingly, the pull-up node Q and the output node P are maintained at the gate-off voltage Voff.

In the first scan period t1, the pull-down node QB of the output node control unit 230 is maintained at the gate-on voltage Von that was input through the sixth transistor T6 and the reset transistor Te in the previous frame. The fifth transistor T5 and the pull-down transistor T8 remain turned on by the gate-on voltage Von maintained by the pull-down node QB. The fifth transistor T5 turned on by the gate-on voltage Von of the pull-down node QB applies the gate-on voltage Von to the second electrode of the third transistor T3 and the first electrode connection node of the fourth transistor T4. In addition, the pull-down transistor T8 is turned on by the gate-on voltage Von of the pull-down node QB, and applies the gate-off voltage Voff to the scan output terminal SCO and the scan signal line SCL.

During the first scan period t1, one scan clock signal CLK3 from among the scan clock signals CLK1 to CLK4 is input to the gate electrode of the first transistor T1 through the second scan clock terminal SCI2. For example, the first transistor T1 is turned on by the third scan clock signal CLK3 input to the gate electrode in the first scan period t1.

Figure 10:
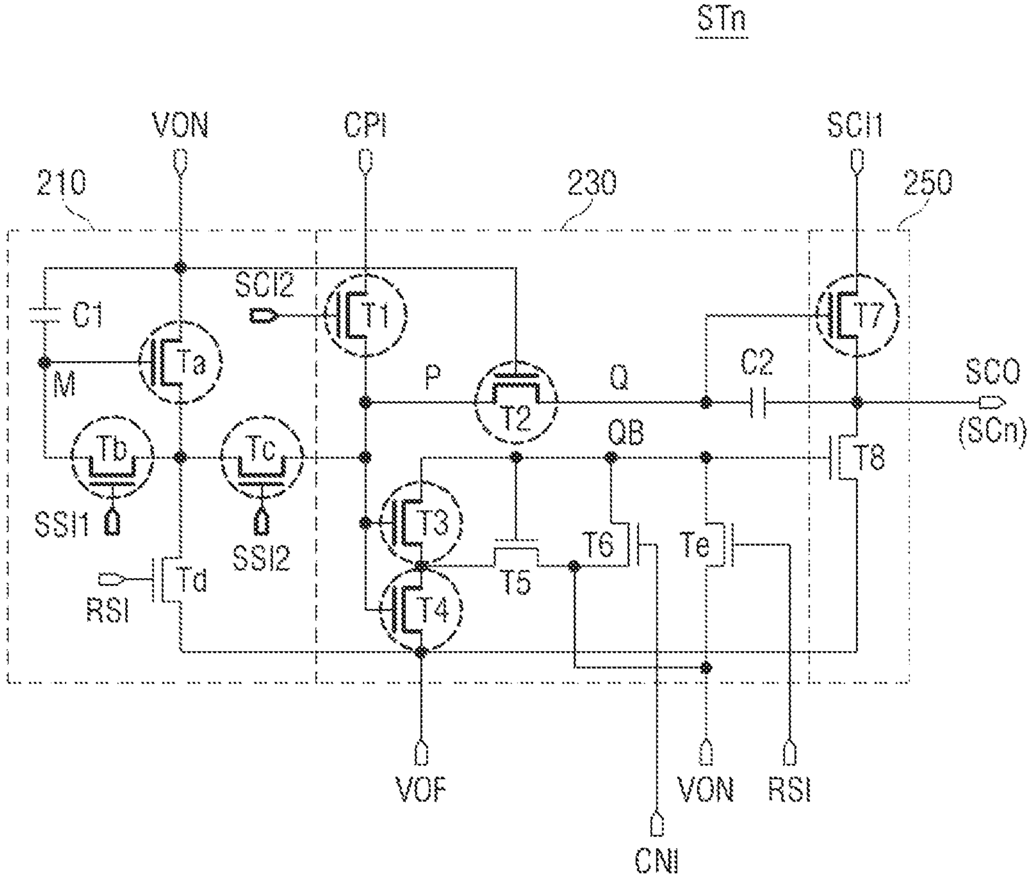
FIG. 10 is a circuit diagram showing an operation of the $n^{th}$ stage in a second scan period of the active period.

FIG. 10 is a circuit diagram showing an operation of the $n^{th}$ stage in a second scan period of the active period.

Referring to FIGS. 8 and 10, in the second scan period t2 for supplying the gate-on voltage Von to the pull-up node Q, the $n^{th}$ stage STn supplies the previous-stage carry signal, e.g., the $(n-1)^{th}$ scan signal SC(n−1), to the pull-up node Q in response to the third scan clock signal CLK3 from among the scan clock signals CLK1 to CLK4. At this time, the gate-on voltage Von is supplied to the sensing control node M of the $n^{th}$ stage STn by the line select signal LSP and the holding control signal HP. In addition, the gate-off voltage Voff is applied to the pull-down node QB.

In more detail, in the second scan period t2, the first transistor T1 of the output node control unit 230 is turned on by the third scan clock signal CLK3, and supplies the $(n-1)^{th}$ scan signal SC(n−1) from the previous stage to the output node P and the pull-up node Q. Although the pull-up transistor T7 is turned on by the gate-on voltage Von of the pull-up node Q and becomes enabled, the gate-off voltage Voff is applied to the first electrode of the pull-up transistor T7. Accordingly, the gate-off voltage Voff is also applied to the $n^{th}$ scan signal line SCLn.

In the second scan period t2, the second and third sensing transistors Tb and Tc of the sensing control unit 210 are concurrently (e.g., simultaneously or substantially simultaneously) turned on in response to the line select signal LSP and the holding control signal HP, respectively. Accordingly, the second and third sensing transistors Tb and Tc allow the first sensing transistor Ta to be turned on by the gate-on voltage Von of the gate-on terminal VON and the gate-on voltage Von to be supplied to the sensing control node M.

In the second scan period t2, the third and fourth transistors T3 and T4 are turned on by the gate-on voltage Von of the output node P, and applies the gate-off voltage Voff of the gate-off terminal VOF to the pull-down node QB. Accordingly, the pull-down transistor T8 of the output unit 250 is turned off.

Figure 11:
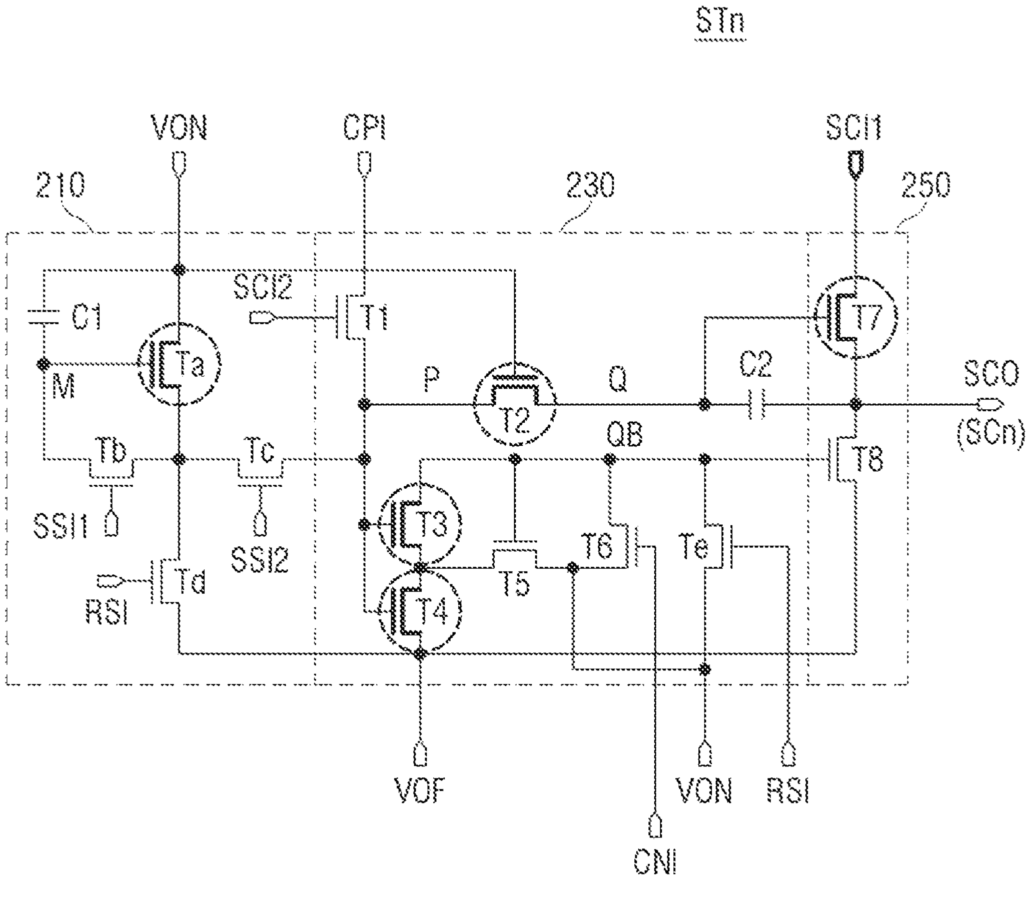
FIG. 11 is a circuit diagram showing an operation of the $n^{th}$ stage in a third scan period of the active period.

FIG. 11 is a circuit diagram showing an operation of the $n^{th}$ stage in a third scan period of the active period.

Referring to FIGS. 8 and 11, in the third scan period t3, which is a scan signal output period, the $n^{th}$ stage STn outputs the first scan clock signal CLK1 to the scan output terminal SCO, while the pull-up node Q is maintained at the gate-on voltage Von. Accordingly, the $n^{th}$ scan signal SCn of the gate-on voltage Von is applied to the $n^{th}$ scan signal line SCLn.

In more detail, in the third scan period t3, the pull-up transistor T7 of the output unit 250 is turned on by the gate-on voltage Von of the pull-up node Q, and receives the first scan clock signal CLK1 to output the first scan clock signal CLK1 to the scan output terminal SCO. The $n^{th}$ scan signal SCn may be applied to the $n^{th}$ scan signal line SCLn, and at the same time, the $n^{th}$ scan signal SCn may be supplied to the subsequent $(n+1)^{th}$ stage ST(n+1) as a carry signal. During the third scan period t3, the pull-up transistor T7, the second to fourth transistors T2 to T4, and the first sensing transistor Ta remain turned on.

As the first scan clock signal CLK1 is input to the pull-up transistor T7 while the pull-up node Q is maintained at the gate-on voltage Von, the voltage Q(node_v) of the pull-up node Q may be bootstrapped. Because the second transistor T2 working as a diode is disposed in series between the output node P of the first transistor T1 and the pull-up node Q, even if the pull-up node Q is bootstrapped, the first transistor T1 and the third and fourth transistors T3 and T4 may receive the gate-on voltage Von of the output node P regardless of a change in the voltage level of the pull-up node Q.

Figure 12:
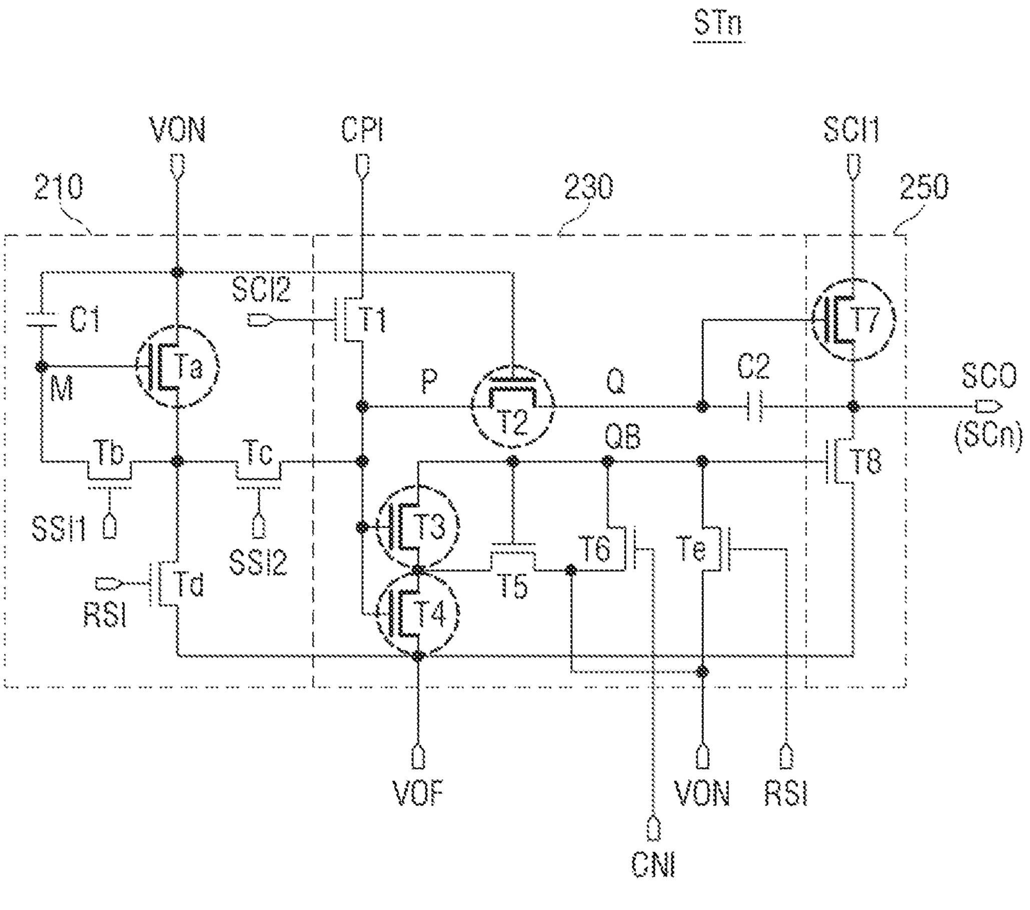
FIG. 12 is a circuit diagram showing an operation of the $n^{th}$ stage in a fourth scan period of the active period.

FIG. 12 is a circuit diagram showing an operation of the nth stage STn in a fourth scan period of the active period.

Referring to FIGS. 8 and 12, in the fourth scan period t4 when the scan signals transition to the gate-off voltage, the $n^{th}$ stage STn applies the gate-off voltage Voff to the scan output terminal SCO through the pull-up transistor T7 as the first scan clock signal CLK1 transition to the gate-off voltage Voff level. As a result, the voltage of the $n^{th}$ scan signal line SCLn transitions to the gate-off voltage Voff.

In more detail, in the fourth scan period t4, while the pull-up transistor T7 of the output unit 250 remains turned on by the gate-on voltage Von of the pull-up node Q, the first scan clock signal CLK1 input through the first scan clock terminal SCI transitions to the gate-off voltage Voff. Therefore, the pull-up transistor T7 allows the gate-off voltage Voff to be applied to the scan output terminal SCO and the $n^{th}$ scan signal line SCLn, so that the voltage of the $n^{th}$ scan signal line SCLn transitions to the gate-off voltage Voff. During the fourth scan period t4, the pull-up transistor T7, the second to fourth transistors T2 to T4, and the first sensing transistor Ta remain turned on.

Figure 13:
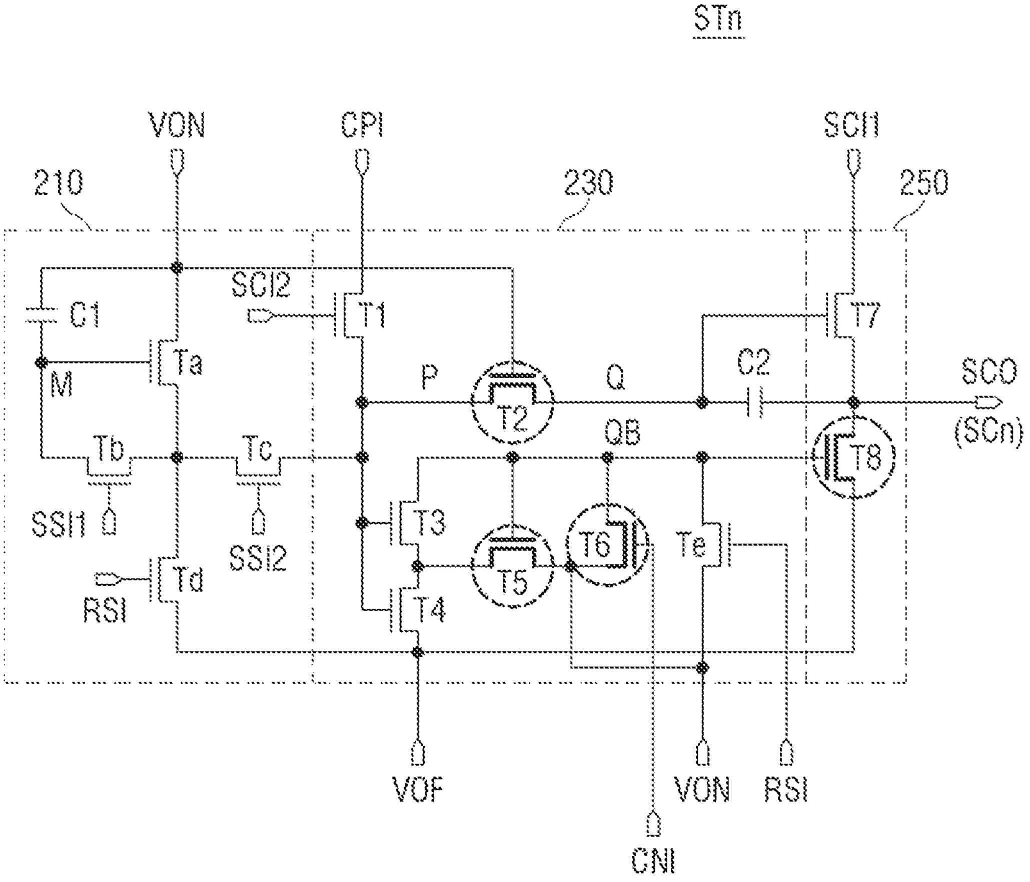
FIG. 13 is a circuit diagram showing an operation of the $n^{th}$ stage in a fifth scan period of the active period.

FIG. 13 is a circuit diagram showing an operation of the $n^{th}$ stage in a fifth scan period of the active period.

Referring to FIGS. 8 and 13, in a fifth scan period t5 for applying the gate-off voltage Voff to the pull-up node Q, the $n^{th}$ stage STn supplies the gate-on voltage Von to the pull-down node QB when the $(n+2)^{th}$ scan signal SC(n+2) is input from the subsequent $(n+2)^{th}$ stage ST(n+2) as a carry signal.

In more detail, the sixth transistor T6 of the output node control unit 230 is turned on by the $(n+2)^{th}$ scan signal SC(n+2) input from the subsequent $(n+2)^{th}$ stage ST(n+2), to supply the gate-on voltage Von of the gate-on terminal VON to the pull-down node QB. When the gate-on voltage Von is supplied to the pull-down node QB by the sixth transistor T6, the fifth transistor T5 and the pull-down transistor T8 are turned on by the gate-on voltage Von. The pull-down transistor T8 turned on by the gate-on voltage Von applies the gate-off voltage Voff to the scan output terminal SCO and the $n^{th}$ scan signal line SCLn.

During the fifth scan period t5, the gate-on voltage Von is supplied to the second electrode of the third transistor T3 and the first electrode connection node of the fourth transistor T4 by the fifth transistor T5. Accordingly, the third and fourth transistors T3 and T4 do not operate in the depletion mode, as the voltages of the first and second electrodes are maintained higher than the voltages of the gate electrodes. Accordingly, the gate-on voltage Von of the pull-down node QB may be maintained without decreasing. Further, the pull-up node Q is maintained at the gate-off voltage Voff while the pull-down node QB is maintained at the gate-on voltage Von.

Figure 14:
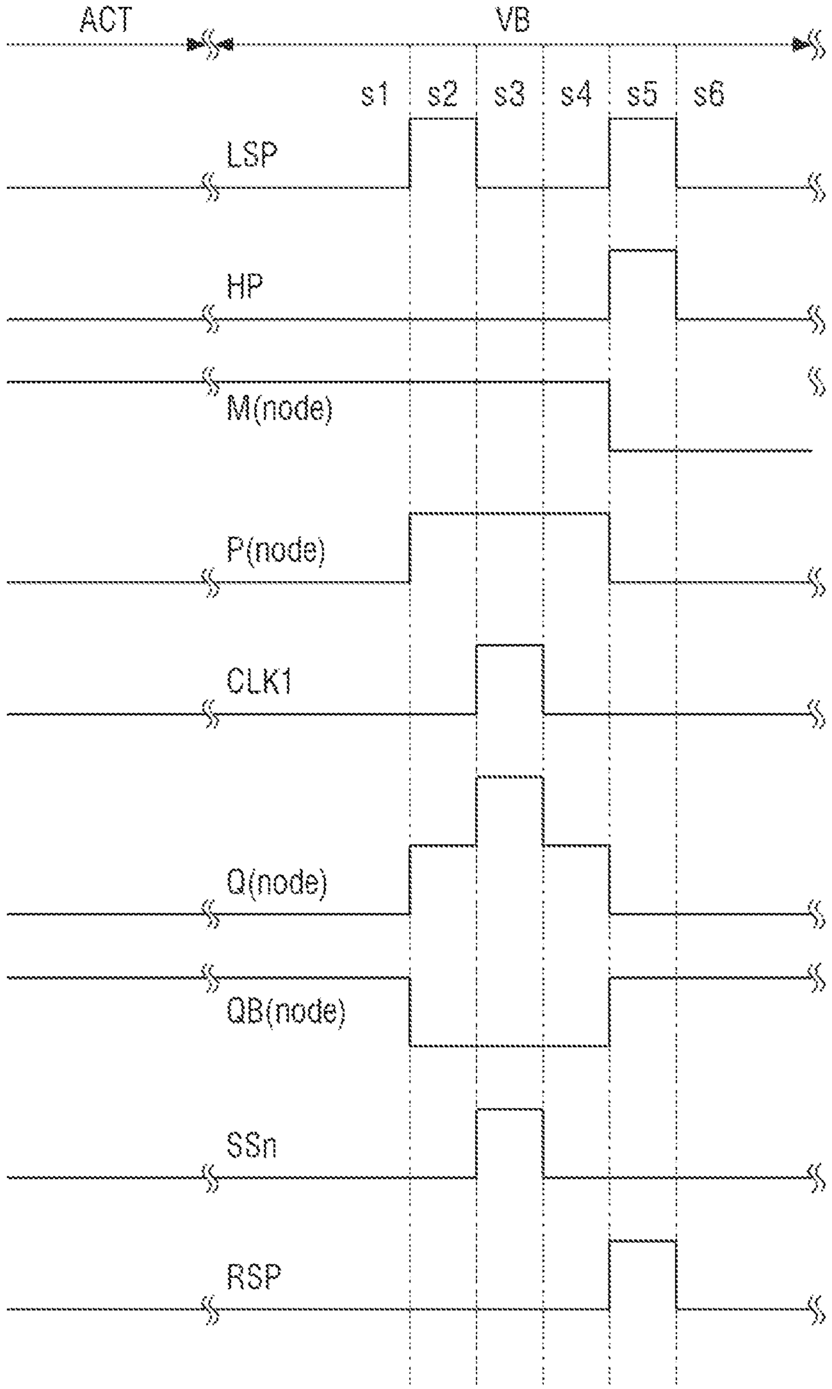
FIG. 14 is a waveform diagram showing sensing control clock signals, a reset signal, a scan pulse signal, and changes in voltage levels of a pull-up node during a sensing period of the $n^{th}$ frame.

FIG. 14 is a waveform diagram showing sensing control clock signals, a reset signal, a scan pulse signal, and changes in voltage levels of a pull-up node during a sensing period (e.g., a vertical blank period) of the $n^{th}$ frame.

Referring to FIG. 14, a line select signal LSP from among the sensing control clock signals may be generated at the gate-on voltage Von for a suitable period (e.g., a predetermined period) during which the gate-on voltage Von is applied to the third sensing transistor Tc of the sensing control unit 210, for example, such as approximately one horizontal period 1H, and may be supplied to the third sensing transistor Tc of the sensing control unit 210. The line select signal LSP is generated during a vertical blank period VB, or in more detail, in a second sensing period s2 in which the gate-on voltage Von of the sensing control node M is supplied to the pull-up node Q, and in a fifth sensing period s5 in which the gate-off voltage Voff is applied to the sensing control node M and the pull-up node Q from among the sensing periods. The third sensing transistor Tc is turned on in response to the line select signal LSP input during the vertical blank period VB, so that the gate-on voltage of the gate-on terminal VON is supplied to the pull-up node Q of the output node control unit 230 through the turned-on first sensing transistor Ta.

From among the sensing control clock signals, a holding control signal HP is generated at the level of the gate-on voltage Von for one horizontal period 1H, and is supplied to the second sensing transistor Tb of the sensing control unit 210. The holding control signal HP is generated concurrently (e.g., simultaneously or substantially simultaneously) with the line select signal LSP during the fifth sensing period s5 in which the gate-off voltage Voff is applied to the sensing control node M and the pull-up node Q during sensing.

The reset signal RSP is generated at the level of the gate-on voltage Von for one horizontal period 1H, and is supplied to the reset transistor Te of the output node controller 230. The reset signal RSP is generated during the fifth sensing period s5 in which the gate-on voltage Von is supplied to the pull-down node QB from among the sensing periods, and may be supplied to the gate electrode of the reset transistor Te. In addition, the reset signal RSP is supplied to the third sensing transistor Tc to reset the output node P and the pull-up node Q.

The first to fourth scan clock signals CLK1, CLK2, CLK3, and CLK4 are generated at the level of the gate-on voltage Von for each horizontal period 1H randomly or in a suitable order (e.g., a predetermined order) during the vertical blank period VB. At least one scan clock signal from among the first to fourth scan clock signals CLK1, CLK2, CLK3, and CLK4 generated at the level of the gate-on voltage Von is selectively or randomly supplied to the $(n-2)^{th}$ to $(n+2)^{th}$ stages ST(n−2) to ST(n+2). The first to fourth scan clock signals CLK1, CLK2, CLK3, and CLK4 are repeated every four stages STn to ST(n+3), e.g., four scan signal lines SCLn to SCL(n+3).

In the vertical blank period VB, which is the sensing period of every frame (e.g., nth frame), each of the selected $(n-2)^{th}$ to $(n+2)^{th}$ stages ST(n−2) to ST(n+2) from among all the stages ST1 to STn operates separately in the first to sixth sensing periods s1 to s6.

Hereinafter, operations of the $n^{th}$ stage STn during the first to sixth sensing periods s1 to s6 of a vertical blank period VB will be described in more detail with reference to FIGS. 14 to 20.

Figure 15:
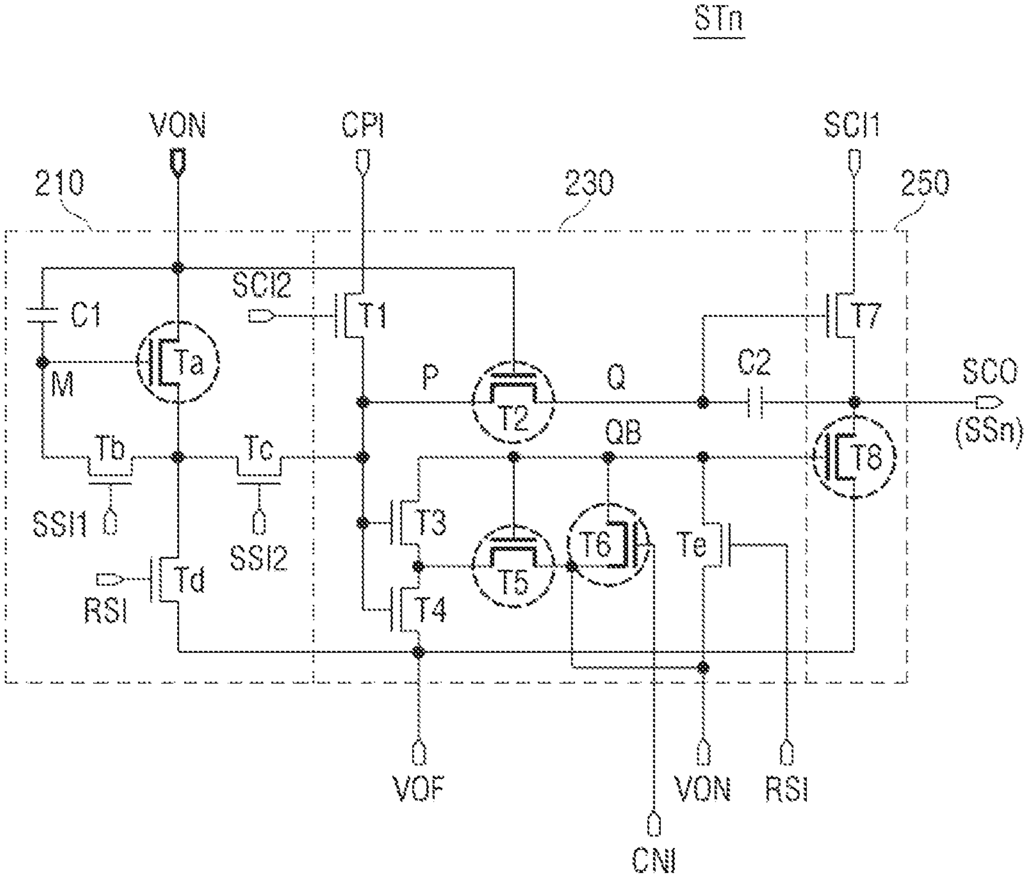
FIG. 15 is a circuit diagram showing an operation of the $n^{th}$ stage in a first sensing period of a vertical blank period.

FIG. 15 is a circuit diagram showing an operation of the $n^{th}$ stage in a first sensing period of a vertical blank period.

Referring to FIGS. 14 and 15, in the first sensing period s1, which is a scan initialization period, the pull-up node Q of the $n^{th}$ stage STn is maintained at the level of the gate-off voltage Voff, and the pull-down node QB is maintained at the level of the gate-on voltage Von by the subsequent-stage carry signal that is input to the subsequent-stage carry terminal CNI.

In more detail, during the first sensing period s1, the pull-down node QB is maintained at the gate-on voltage Von input through the sixth transistor T6. The fifth transistor T5 and the pull-down transistor T8 remain turned on by the gate-on voltage Von of the pull-down node QB. As described above, the fifth transistor T5 turned on by the gate-on voltage Von of the pull-down node QB applies the gate-on voltage Von to the second electrode of the third transistor T3 and the first electrode connection node of the fourth transistor T4. In addition, the pull-down transistor T8 is turned on by the gate-on voltage Von of the pull-down node QB, and applies the gate-off voltage Voff to the scan output terminal SCO and the scan signal line SCL.

Figure 16:
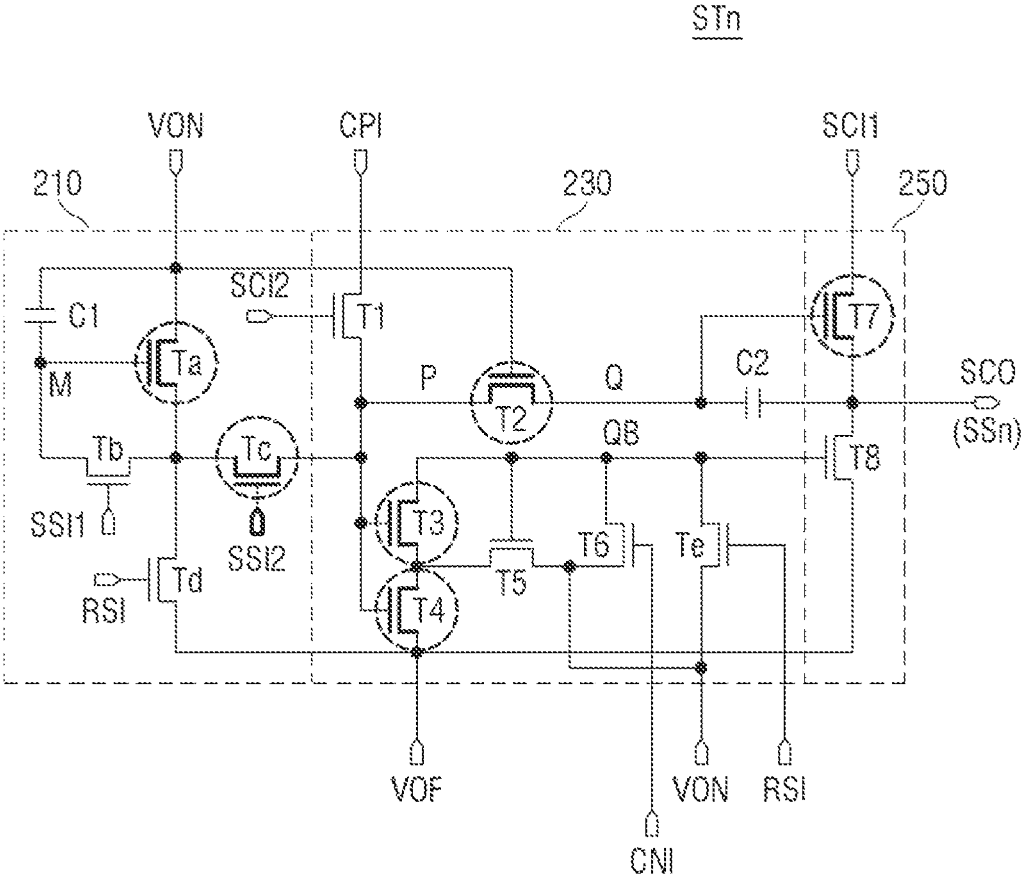
FIG. 16 is a circuit diagram showing an operation of the $n^{th}$ stage in a second sensing period of the vertical blank period.

FIG. 16 is a circuit diagram showing an operation of the $n^{th}$ stage in a second sensing period of the vertical blank period.

Referring to FIGS. 14 and 16, in the second sensing period s2, the $n^{th}$ stage STn supplies the gate-on voltage Von of the sensing control node M to the output node P and the pull-up node Q of the output node control unit 230 to turn on the pull-up transistor T7. The gate-off voltage Voff is applied to the pull-down node QB.

In more detail, the third sensing transistor Tc of the sensing control unit 210 is turned on by the line select signal LSP, and supplies the gate-on voltage Von of the sensing control node M to the output node P and the pull-up node Q of the output node control unit 230. Accordingly, the pull-up transistor T7 of the pull-up node Q may be turned on. Even when the pull-up transistor T7 is turned on, a first scan pulse signal CLK1 at the level of the gate-off voltage Voff is applied to the source terminal of the pull-up transistor T7. Accordingly, the gate-off voltage Voff is also applied to the $n^{th}$ scan signal line SCLn.

On the other hand, the third and fourth transistors T3 and T4 each having the gate electrode connected to the output node P are turned on by the gate-on voltage Von of the output node P, to apply the gate-off voltage Voff to the pull-down node QB. As a result, the pull-down transistor T8 of the pull-down node QB is turned off.

Figure 17:
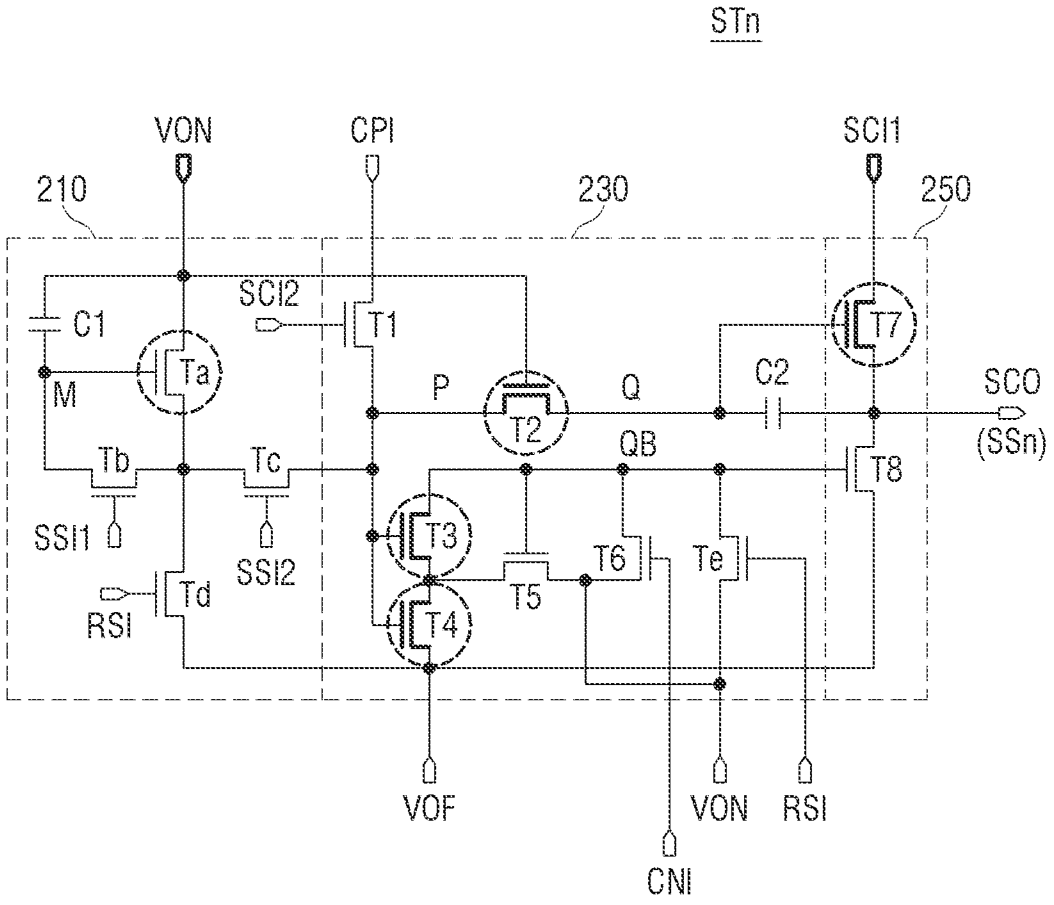
FIG. 17 is a circuit diagram showing an operation of the $n^{th}$ stage in a third sensing period of the vertical blank period.

FIG. 17 is a circuit diagram showing an operation of the $n^{th}$ stage in a third sensing period of the vertical blank period.

Referring to FIGS. 14 and 17, in the third sensing period s3, the $n^{th}$ stage STn outputs the first scan clock signal CLK1 input to the first scan clock terminal SCI1 to the scan output terminal SCO. Accordingly, the first scan clock signal CLK1 is applied to the $n^{th}$ scan signal line SCLn as the $n^{th}$ sensing signal SSn of the gate-on voltage Von.

In more detail, in the third sensing period s3, the pull-up transistor T7 of the output unit 250 is turned on by the gate-on voltage Von of the pull-up node Q, and receives the first scan clock signal CLK1 to output the first scan clock signal CLK1 to the scan output terminal SCO. The first scan clock signal CLK1 is applied to the $n^{th}$ scan signal line SCLn as the $n^{th}$ sensing signal SSn. During the third sensing period s3, the pull-up transistor T7, the second to fourth transistors T2 to T4, and the first sensing transistor Ta remain turned on.

Figure 18:
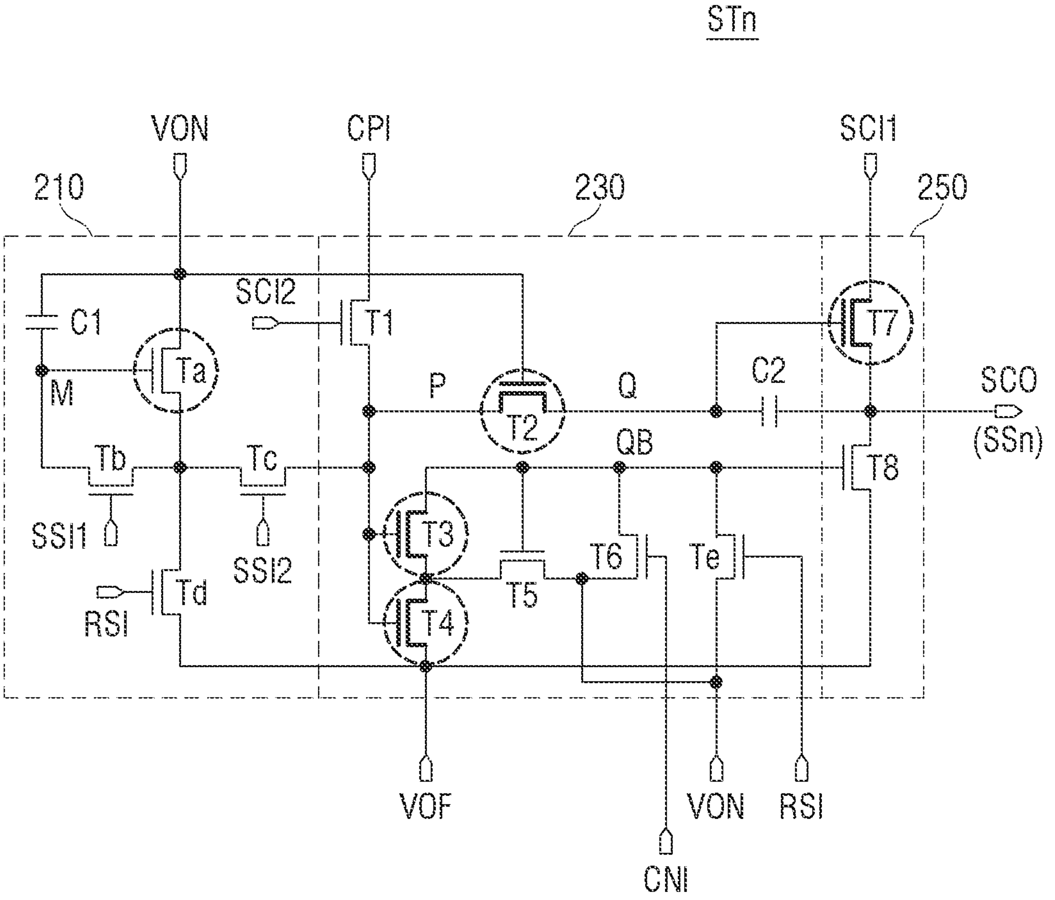
FIG. 18 is a circuit diagram showing an operation of the $n^{th}$ stage in a fourth sensing period of the vertical blank period.

FIG. 18 is a circuit diagram showing an operation of the $n^{th}$ stage in a fourth sensing period of the vertical blank period.

Referring to FIGS. 14 and 18, in the fourth sensing period s4, the $n^{th}$ stage STn outputs the gate-off voltage Voff to the scan output terminal SCO and applies the gate-off voltage Voff to the $n^{th}$ scan signal line SCLn.

In more detail, in the fourth sensing period s4, while the pull-up transistor T7 of the output unit 250 remains turned on by the gate-on voltage Von of the pull-up node Q, the first scan clock signal CLK1 transitions to the gate-off voltage Voff. Therefore, the pull-up transistor T7 applies the gate-off voltage Voff to the scan output terminal SCO and the $n^{th}$ scan signal line SCLn, so that the voltage of the $n^{th}$ scan signal line SCLn transitions to the gate-off voltage Voff. During the fourth sensing period s4, the pull-up transistor T7, the second to fourth transistors T2 to T4, and the first sensing transistor Ta remain turned on.

Figure 19:
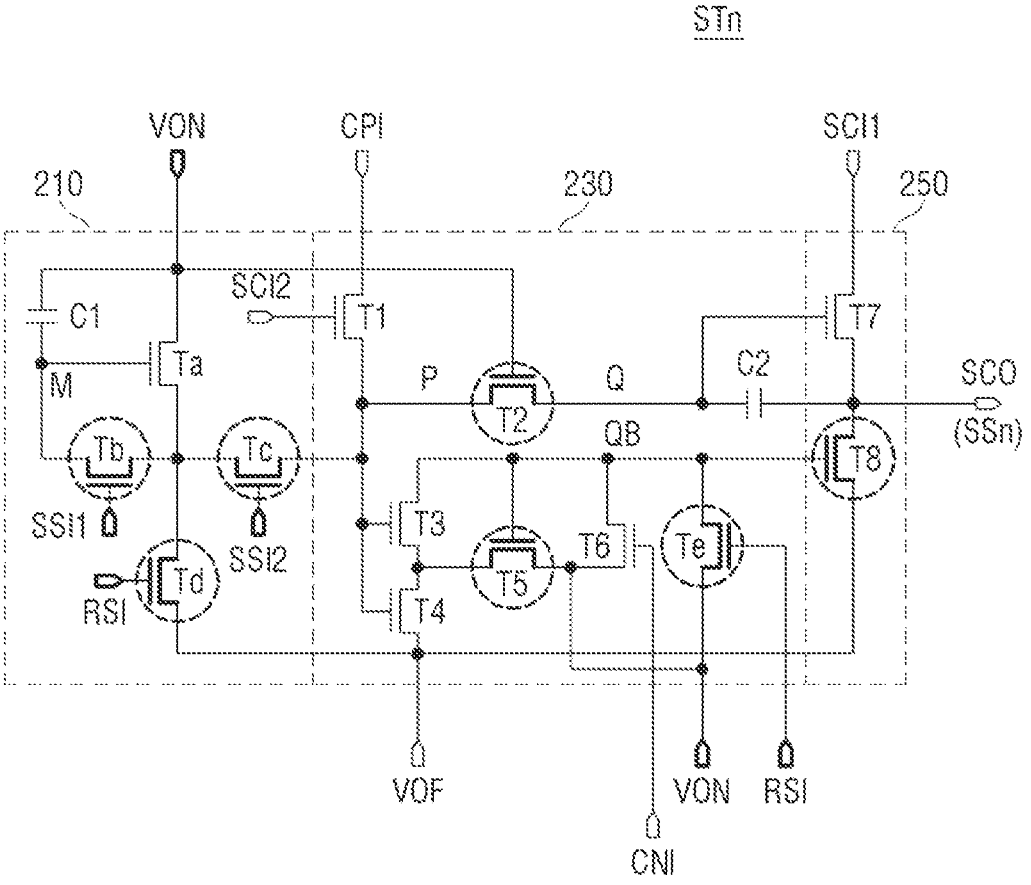
FIG. 19 is a circuit diagram showing an operation of the $n^{th}$ stage in a fifth sensing period of the vertical blank period.

FIG. 19 is a circuit diagram showing an operation of the $n^{th}$ stage in a fifth sensing period of the vertical blank period.

Referring to FIGS. 14 and 19, in the fifth sensing period s5, the $n^{th}$ stage STn supplies the gate-on voltage Von to the pull-down node QB, and applies the gate-off voltage Voff to the sensing control node M, the pull-up node Q, and the scan output terminal SCO.

In more detail, in the fifth sensing period s5, the second sensing transistor Tb of the sensing control unit 210 is turned on by the holding control signal HP, and the third sensing transistor Tc is turned on by the line select signal LSP. At the same time, the fourth sensing transistor Td of the sensing control unit 210 and the reset transistor Te of the output node control unit 230 are turned on by the reset signal RSP. As such, when the second to fourth sensing transistors Tb, Tc, and Td of the sensing control unit 210 are concurrently (e.g., simultaneously or substantially simultaneously) turned on, the gate-off voltage Voff is applied to the sensing control node M.

On the other hand, the reset transistor Te turned on by the reset signal RSP supplies the gate-on voltage Von of the gate-on terminal VON to the pull-down node QB. When the gate-on voltage Von is supplied to the pull-down node QB by the reset transistor Te, the fifth transistor T5 and the pull-down transistor T8 are turned on by the gate-on voltage Von. The pull-down transistor T8 turned on by the gate-on voltage Von applies the gate-off voltage Voff to the pull-up node Q, the scan output terminal SCO, and the $n^{th}$ scan signal line SCLn.

Figure 20:
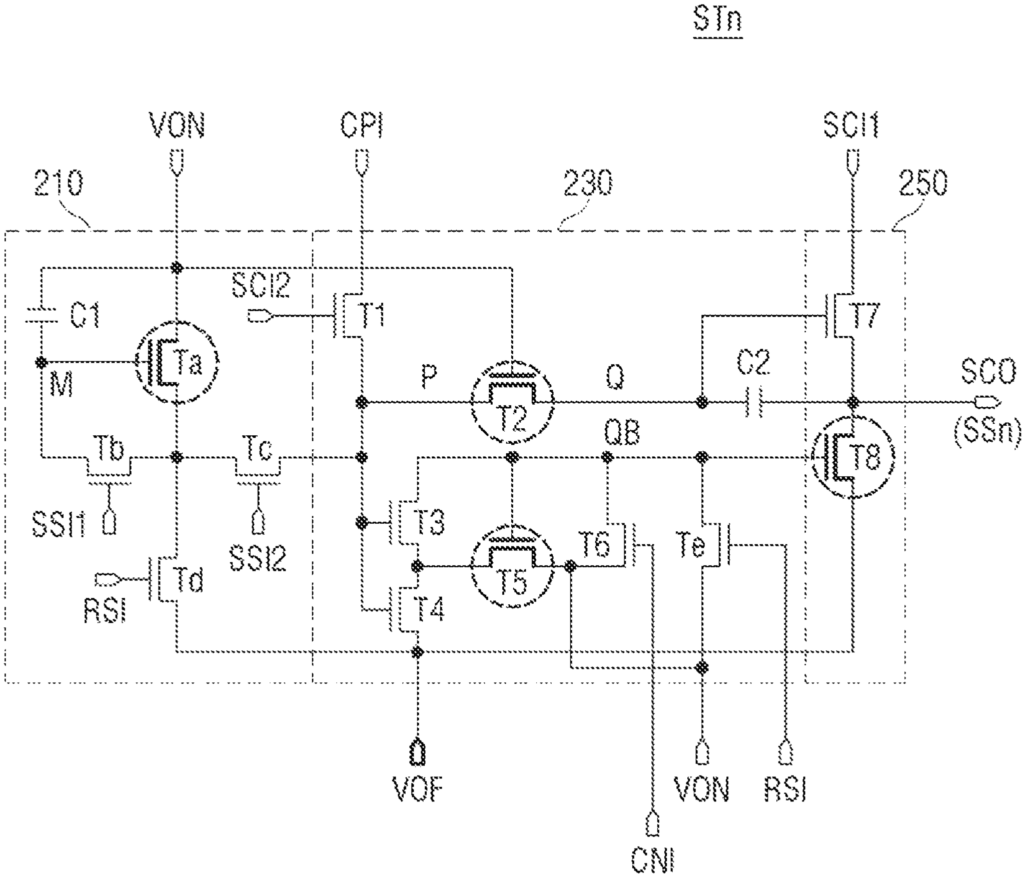
FIG. 20 is a circuit diagram showing an operation of the $n^{th}$ stage in a sixth sensing period of the vertical blank period.

FIG. 20 is a circuit diagram showing an operation of the $n^{th}$ stage in a sixth sensing period of the vertical blank period.

Referring to FIGS. 14 and 20, in the sixth scan period s6, the $n^{th}$ stage STn maintains the gate-on voltage of the pull-down node QB so that it does not decrease, thereby maintaining the voltage of the pull-up node Q, the scan output terminal SCO, and the scan signal line SCL at the gate-off voltage Voff as well.

In more detail, in the sixth scan period s6, the fifth transistor T5 and the pull-down transistor T8 remain turned on by the gate-on voltage Von of the pull-down node QB. The fifth transistor T5 turned on by the gate-on voltage Von of the pull-down node QB supplies the gate-on voltage Von to the second electrode of the third transistor T3 and the first electrode connection node of the fourth transistor T4. As the voltages of the source and drain electrodes of the third and fourth transistors T3 and T4 are maintained higher than the voltages of the gate electrodes thereof, they do not operate in the depletion mode. As a result, the gate-on voltage Von of the pull-down node QB may be maintained without decreasing. The pull-down node QB is maintained at the gate-on voltage Von that is input through the reset transistor Te, and the pull-up node Q is maintained at the gate-off voltage Voff.

When the vertical blank period VB ends, the $(n-2)^{th}$ to $(n+2)^{th}$ stages ST(n−2) to ST(n+2) repeat the processes of sequentially outputting the scan signals SCI to SCn again in response to the scan control signal input during the active period ACT and the vertical blank period VB of the next frame (n+1) frame, and output the sensing signals SSI to SSn selectively or randomly.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A scan signal driver comprising:

stages configured to sequentially output scan signals to scan signal lines in an active period of an $n^{th}$ frame, and to selectively output sensing signals to the scan signal lines in a vertical blank period of the $n^{th}$ frame, where n is a positive integer, wherein at least one of the stages comprises:

a sensing control circuit to supply a gate-on voltage to a sensing control node in response to a holding control signal and a line select signal concurrently input during the active period, and to output the gate-on voltage of the sensing control node to an output node in response to the line select signal selectively input while the holding control signal has an inactive level during the vertical blank period;

an output node control circuit comprising a transistor electrically connected between the output node and a pull-up node to supply the gate-on voltage to the pull-up node when the gate-on voltage of the sensing control node is output to the output node during the vertical blank period; and an output circuit to output a scan clock signal input through a first scan clock terminal as a sensing signal to one of the scan signal lines when the gate-on voltage is supplied to the pull-up node during the vertical blank period.

2. The scan signal driver of claim 1, wherein the sensing control circuit comprises:

a first sensing transistor comprising a first electrode and a gate electrode connected to a gate-on terminal to form a first capacitor between the first electrode and the gate electrode;

a second sensing transistor comprising:

a first electrode connected to the gate electrode of the first sensing transistor to form the sensing control node;

a second electrode connected to a second electrode of the first sensing transistor; and a gate electrode connected to an input terminal of the holding control signal;

a third sensing transistor comprising:

a first electrode connected to the second electrodes of the first and second sensing transistors;

a second electrode connected to the pull-up node; and a gate electrode connected to an input terminal of the line select signal;

and a fourth sensing transistor comprising:

a first electrode connected to the second electrodes of the first and second sensing transistors;

a second electrode connected to a gate-off terminal; and a gate electrode connected to an input terminal of a reset signal.

3. The scan signal driver of claim 2, wherein, when the second and third sensing transistors are turned on in response to the line select signal and the holding control signal input at a level of the gate-on voltage during a first period of the active period, the gate-on voltage is supplied to the sensing control node.

4. The scan signal driver of claim 3, wherein, when the second and third sensing transistors are turned off in response to the line select signal and the holding control signal input at a level of a gate-off voltage during a second period of the active period, the sensing control node is maintained at the level of the gate-on voltage, and wherein a voltage of the second electrode of the third sensing transistor connected to the pull-up node is maintained at a level equal to or greater than a level of a voltage of the first electrode of the third sensing transistor.

5. The scan signal driver of claim 4, wherein, when the third sensing transistor is turned on by the line select signal input at the level of the gate-on voltage during a first period of the vertical blank period, the gate-on voltage of the sensing control node is supplied to the pull-up node.

6. The scan signal driver of claim 1, wherein the output node control circuit comprises:

a first transistor comprising:

a first electrode connected to a previous-stage carry terminal;

a second electrode connected to the pull-up node; and a gate electrode connected to a second scan clock terminal;

a second transistor as the transistor electrically connected between the output node and the pull-up node, and comprising:

a first electrode connected to the second electrode of the first transistor;

a second electrode connected to the pull-up node; and a gate electrode connected to a gate-on terminal, and configured to remain turned on by the gate-on voltage;

a third transistor comprising:

a first electrode connected to a pull-down node; and a gate electrode comprised by the second electrode of the first transistor to form the output node of the first transistor;

a fourth transistor comprising:

a first electrode connected to a second electrode of the third transistor;

a second electrode connected to a gate-off terminal; and a gate electrode connected to the second electrode of the first transistor and the gate electrode of the third transistor;

a fifth transistor comprising:

a second electrode connected to the second electrode of the third transistor and the first electrode of the fourth transistor;

a first electrode connected to the gate-on terminal; and a gate electrode connected to the pull-down node;

a sixth transistor comprising:

a first electrode connected to the gate-on terminal;

a second electrode connected to the pull-down node; and a gate electrode connected to a subsequent-stage carry terminal; and a reset transistor comprising:

a first electrode connected to the gate-on terminal;

a second electrode connected to the pull-down node; and a gate electrode connected to a reset terminal configured to receive a reset signal.

7. The scan signal driver of claim 6, wherein, when the gate-on voltage is supplied to the pull-down node during a third period of the active period, the fifth transistor is turned on by the gate-on voltage of the pull-down node, and wherein the gate-on voltage of the gate-on terminal is supplied to the second electrode of the third transistor and the first electrode of the fourth transistor.

8. The scan signal driver of claim 7, wherein a voltage supplied to the second electrode of the third transistor and the first electrode of the fourth transistor during the third period of the active period are maintained at a level higher than levels of voltages of the gate electrodes of the third and fourth transistors.

9. The scan signal driver of claim 6, wherein the output circuit comprises:

a pull-up transistor comprising:

a first electrode connected to the first scan clock terminal;

a second electrode connected to a scan output terminal; and a gate electrode connected to the pull-up node; and a pull-down transistor comprising:

a first electrode connected to the scan output terminal;

a second electrode connected to the gate-off terminal; and a gate electrode connected to the pull-down node.

10. A scan signal driver comprising:

stages configured to sequentially output scan signals to scan signal lines in an active period of an $n^{th}$ frame, and to selectively output sensing signals to the scan signal lines in a vertical blank period of the $n^{th}$ frame, where n is a positive integer, wherein at least one of the stages comprises:

a sensing control circuit to supply a gate-on voltage to a sensing control node in response to a holding control signal and a line select signal concurrently input during the active period, and to output the gate-on voltage of the sensing control node to an output node during the vertical blank period;

an output node control circuit comprising a transistor electrically connected between the output node and a pull-up node to supply a start signal or a previous-stage carry signal to the pull-up node during the active period, and to supply the gate-on voltage output from the sensing control circuit at the output node to the pull-up node during the vertical blank period; and an output circuit to output a scan clock signal input through a first scan clock terminal as a sensing signal to one of the scan signal lines when the gate-on voltage is supplied to the pull-up node during the vertical blank period, and wherein the sensing control circuit comprises:

a first sensing transistor comprising a first electrode and a gate electrode connected to a gate-on terminal to form a first capacitor between the first electrode and the gate electrode;

a second sensing transistor forming the sensing control node with the first sensing transistor, and configured to hold the gate-on voltage of the sensing control node in response to the holding control signal;

a third sensing transistor connected in series with the first and second sensing transistors to supply the gate-on voltage of the sensing control node to the pull-up node in response to the line select signal; and a fourth sensing transistor to apply a gate-off voltage to the sensing control node in response to a reset signal.

11. The scan signal driver of claim 10, wherein the line select signal and the holding control signal are concurrently input during a first period of the active period to the at least one of the stages, and the sensing control circuit is configured to supply the gate-on voltage to the sensing control node and maintain a voltage of the sensing control node at the gate-on voltage until the vertical blank period.

12. The scan signal driver of claim 11, wherein, when the line select signal is input during a first period of the vertical blank period to the at least one of the stages, the sensing control circuit is configured to supply the gate-on voltage of the sensing control node to the pull-up node, and wherein, when the reset signal is input during a second period of the vertical blank period to the at least one of the stages, the sensing control circuit is configured to apply the gate-off voltage to the sensing control node in response to the reset signal.

13. The scan signal driver of claim 11, wherein, when the third sensing transistor is turned on in response to the line select signal having a gate-on voltage level during the first period of the active period, the gate-on voltage is supplied to the sensing control node, and wherein, when the line select signal is input with a gate-off voltage level during a second period of the active period, the third sensing transistor is configured to maintain a level of the gate-on voltage of the sensing control node while it is turned off.

14. The scan signal driver of claim 11, wherein the output node control circuit comprises:

a first transistor configured to supply the start signal or the previous-stage carry signal to the pull-up node in response to one scan clock signal input during the active period;

a second transistor as the transistor electrically connected between the output node and the pull-up node, and connected in series between the first transistor and the pull-up node to separate the output node of the first transistor from the pull-up node;

third and fourth transistors connected in series between a pull-down node and a gate-off terminal to apply a gate-off voltage to the pull-down node in response to the gate-on voltage of the output node;

a fifth transistor configured to apply the gate-on voltage to a connection node of the third and fourth transistors in response to the gate-on voltage of the pull-down node;

a sixth transistor configured to supply the gate-on voltage to the pull-down node when a scan signal is input from one of subsequent stages; and a reset transistor configured to supply the gate-on voltage to the pull-down node when a reset signal is input.

15. The scan signal driver of claim 14, wherein a first electrode of the fifth transistor is connected to a gate-on terminal from which the gate-on voltage is supplied, and a second electrode of the fifth transistor is connected to a second electrode of the third transistor and a first electrode of the fourth transistor, and wherein the fifth transistor is configured to apply the gate-on voltage of the gate-on terminal to the second electrode of the third transistor and the first electrode of the fourth transistor when the gate-on voltage is supplied to the pull-down node.

16. The scan signal driver of claim 14, wherein the output circuit comprises:

a pull-up transistor configured to be turned on by the gate-on voltage of the pull-up node to output one scan clock signal input to the first scan clock terminal to a scan output terminal as the sensing signal during the vertical blank period; and a pull-down transistor configured to be turned on by the gate-on voltage of the pull-down node to apply the gate-off voltage to the scan output terminal.

17. The scan signal driver of claim 14, wherein the at least one stage is configured to operate in response to the line select signal, the holding control signal, first to fourth scan clock signals, the previous-stage carry signal, and a subsequent-stage scan signal input during the active period, and wherein the active period in which the at least one stage operates is divided into a scan initialization period, the first period in which the gate-on voltage is supplied to the pull-up node, a second period in which scan signals are output, a third period in which the scan signals transition to the gate-off voltage, and a fourth period in which the gate-off voltage is not applied to the pull-up node.

18. The scan signal driver of claim 17, wherein, during the scan initialization period, a first transistor of the output node control circuit is configured to be turned on in response to one scan clock signal from among the first to fourth scan clock signals in the at least one stage, wherein the second and third sensing transistors of the sensing control circuit are configured to be turned on in response to the line select signal and the holding control signal during the first period, and the previous-stage carry signal is supplied to the pull-up node through the first transistor, wherein one of the first to fourth scan clock signals is output to an $n^{th}$ scan signal line through a pull-up transistor of the output circuit during the second period, wherein the one scan clock signal is output to the $n^{th}$ scan signal line through the pull-up transistor of the output circuit with a gate-off voltage level during the third period, and wherein a scan signal of one of the subsequent stages is supplied to the output node control circuit to apply the gate-off voltage to the pull-up node during the fourth period.

19. A display device comprising:

a display panel comprising:

data lines;

scan signal lines crossing the data lines; and pixels connected to the data lines and the scan signal lines;

a data driver configured to apply data voltages to the data lines; and a scan signal driver comprising stages configured to sequentially output scan signals during an active period of each frame, and selectively output sensing signals during a vertical blank period, the stages being configured to sequentially output the scan signals to the scan signal lines in the active period of an $n^{th}$ frame, and to selectively output the sensing signals to the scan signal lines in the vertical blank period of the $n^{th}$ frame, where n is a positive integer, wherein at least one of the stages comprises:

a sensing control circuit to supply a gate-on voltage to a sensing control node in response to a holding control signal and a line select signal concurrently input during the active period, and to output the gate-on voltage of the sensing control node to an output node in response to the line select signal selectively input while the holding control signal has an inactive level during the vertical blank period;

an output node control circuit comprising a transistor electrically connected between the output node and a pull-up node to supply the gate-on voltage to the pull-up node when the gate-on voltage of the sensing control node is output to the output node during the vertical blank period; and an output circuit to output a scan clock signal input through a first scan clock terminal as a sensing signal to one of the scan signal lines when the gate-on voltage is supplied to the pull-up node during the vertical blank period.

20. An electronic device including a display device, a display panel of the display device comprising:

data lines;

scan signal lines crossing the data lines;

pixels connected to the data lines and the scan signal lines;

a data driver configured to apply data voltages to the data lines; and a scan signal driver comprising stages configured to sequentially output scan signals during an active period of each frame, and selectively output sensing signals during a vertical blank period, the stages being configured to sequentially output the scan signals to the scan signal lines in the active period of an nth frame, and to selectively output the sensing signals to the scan signal lines in the vertical blank period of the nth frame, where n is a positive integer, wherein at least one of the stages comprises:

a sensing control circuit to supply a gate-on voltage to a sensing control node in response to a holding control signal and a line select signal concurrently input during the active period, and to output the gate-on voltage of the sensing control node to an output node in response to the line select signal selectively input while the holding control signal has an inactive level during the vertical blank period;

an output node control circuit comprising a transistor electrically connected between the output node and a pull-up node to supply the gate-on voltage to the pull-up node when the gate-on voltage of the sensing control node is output to the output node during the vertical blank period; and an output circuit to output a scan clock signal input through a first scan clock terminal as a sensing signal to one of the scan signal lines when the gate-on voltage is supplied to the pull-up node during the vertical blank period.

* * * * *